(12) United States Patent
Sekimoto et al.

(10) Patent No.: US 8,390,725 B2
(45) Date of Patent: Mar. 5, 2013

(54) CAMERA MODULE, ELECTRONIC DEVICE INCLUDING THE SAME, AND METHOD FOR POSITIONING LENSES OF CAMERA MODULE

(75) Inventors: Yoshihiro Sekimoto, Osaka (JP); Yoshihito Ishizue, Osaka (JP); Shinji Kaioka, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 563 days.

(21) Appl. No.: 12/590,303

(22) Filed: Nov. 4, 2009

(65) Prior Publication Data

US 2010/0110270 A1    May 6, 2010

(30) Foreign Application Priority Data

Nov. 6, 2008  (JP) ................................. 2008-285553
Jun. 11, 2009  (JP) ................................. 2009-140394

(51) Int. Cl.
*G03B 13/00* (2006.01)

(52) U.S. Cl. ......................... 348/340; 348/345; 348/374

(58) Field of Classification Search .................. None
See application file for complete search history.

(56) References Cited

U.S. PATENT DOCUMENTS

| 7,092,174 B2* | 8/2006 | Yamaguchi et al. .......... 359/819 |
| 2002/0131782 A1 | 9/2002 | Yamaguchi et al. |
| 2004/0021951 A1 | 2/2004 | Maeda et al. |
| 2005/0129384 A1* | 6/2005 | Nishida et al. ................ 385/147 |
| 2005/0168846 A1 | 8/2005 | Ye et al. |
| 2005/0201221 A1 | 9/2005 | Maeda et al. |
| 2007/0046109 A1* | 3/2007 | Ho et al. ......................... 310/12 |
| 2008/0143864 A1 | 6/2008 | Yamaguchi et al. |
| 2008/0247063 A1 | 10/2008 | Otsuki et al. |
| 2008/0252775 A1* | 10/2008 | Ryu et al. ...................... 348/374 |
| 2008/0282696 A1* | 11/2008 | Wada et al. ..................... 60/528 |
| 2009/0021624 A1* | 1/2009 | Westerweck et al. ......... 348/308 |
| 2009/0302205 A9* | 12/2009 | Olsen et al. ................... 250/226 |

FOREIGN PATENT DOCUMENTS

| JP | 2003-66300 A | 3/2003 |
| JP | 2005-121893 A | 5/2005 |
| JP | 2006-11234 | 1/2006 |
| JP | 2006222473 A | 8/2006 |
| JP | 2007-116740 A | 5/2007 |
| JP | 2007-193248 A | 8/2007 |
| JP | 2008-11220 A | 5/2008 |
| JP | 2008-197313 A | 8/2008 |

* cited by examiner

*Primary Examiner* — Chieh M Fan
*Assistant Examiner* — Angel L Garces-Rivera
(74) *Attorney, Agent, or Firm* — Edwards Wildman Palmer LLP; David G. Conlin; David J. Silva

(57) ABSTRACT

In a camera module, the position of image pickup lenses at an end at infinity is defined by contact between a bottom surface of a lens barrel and a surface of a sensor cover. This makes it possible to realize a camera module having image pickup lenses positioned with a high degree of accuracy.

26 Claims, 16 Drawing Sheets

CAMERA MODULE, ELECTRONIC DEVICE INCLUDING THE SAME, AND METHOD FOR POSITIONING LENSES OF CAMERA MODULE

This Nonprovisional application claims priority under 35 U.S.C. §119(a) on patent application No. 2008-285553 filed in Japan on Nov. 6, 2008 and patent application No. 2009-140394 filed in Japan on Jun. 11, 2009, the entire contents of which are hereby incorporated by reference.

TECHNICAL FIELD

The present invention relates to camera modules that are mounted in electronic devices such as mobile phones and methods for positioning lenses that are used for camera modules, in particular, to a structure of a camera module and a lens positioning method neither of which requires position adjustment involving the use of a screw in mounting image pickup lenses in a lens drive section.

BACKGROUND ART

In recent years, there have been a larger number of examples where camera modules that fulfill their automatic focusing functions by means of lens drive devices are mounted in electronic devices such as mobile phones. The lens drive devices are commercially available as various types such as types in which stepping motors are used, types in which piezoelectric elements are used, and VCM (voice coil motor) types.

In the case of fixing of lenses to such a lens drive device, the initial position of the lenses with respect to an image pickup element along the optical axis must be set accurately; otherwise, an out-of-focus image will result from defocusing. Further, in a fixed-focus camera module, whose lenses are not moved, the initial position of the lenses can be made more highly accurate by mounting the lenses or a lens holder holing the lenses directly in the image pickup element or a member holding the image pickup element (e.g., see Patent Literature 1).

Citation List
Patent Literature 1
Japanese Patent Application Publication, Tokukai, No. 2003-046825 A (Publication Date: Feb. 14, 2003)
Patent Literature 2
Japanese Patent Application Publication, Tokukai, No. 2008-197313 A (Publication Date: Aug. 28, 2008)

SUMMARY OF INVENTION

Technical Problem

Unfortunately, however, a camera module having an automatic focusing function requires initial focus adjustment because of low accuracy of mounting of image pickup lenses.

Specifically, in a camera module having an automatic focusing function of moving lenses along the optical axis by means of a lens drive device, the lenses or a lens holder are/is mounted in the lens drive device. In this case, at the time of setting of the initial position of the lenses, an error in assembly of the lens drive device (i.e., an error accumulated between a reference plane on which the lens drive device is mounted and a reference plane on which the lenses are mounted) is added. For this reason, it is extremely difficult to mount the lenses without adjusting the error in assembly. Therefore, initial focus adjustment is required for the adjustment of the error in assembly.

That is, a lens drive device in which a stepping motor or a piezoelectric element is used makes it possible to set a comparatively large stroke along the optical axis. For this reason, initial focus adjustment is performed in advance by which a focused focal position at infinity (INF) is searched for during driving of that movable part of the lens drive device in which image pickup lenses have been incorporated. Then, the focused focal position thus adjusted is set as an INF reference position. Furthermore, a focused focal position in a macro state is searched for, too, by further driving the lenses from the INF reference position, and then is set as a macro reference position. This allows the lenses to be mounted appropriately in a position on either the side at infinity or the macro side.

However, in this case, it is necessary to secure an extra stroke in addition to the stroke between the INF position and the macro position in order to absorb an error in mounting location of the lenses with respect to the lens drive device.

Meanwhile, a VCM lens drive device is structured in such a way that a movable part of the lens drive device is supported by a spring. For this reason, when the stroke between the INF position and the macro position is made larger so that the error in mounting location of the lenses with respect to the lens drive device is absorbed, the repulsion of the spring is made larger, too. This results undesirably in a need for great thrust and in a great distortion of the spring due to an increase in amount of deformation of the spring. For this reason, such a method for searching for a focused focal position on the INF side within a stroke is rarely used.

Accordingly, in the VCM lens drive device, the movable part (holder) is held preloaded onto a reference plane on the INF side at an electrical current of 0. Further, the movable part (holder) has a female screw formed on an internal surface thereof, and a lens barrel mounted with lenses has a male screw formed on an external surface thereof. Moreover, in initial focus adjustment, the initial position on the INF side is adjusted by screwing the lens barrel into the movable part (holder). As a result of such adjustment, the lens is in a focused focal position with the movable part held in an INF-side reference position. Therefore, the VCM lens drive device only needs to have a stroke to drive the lenses toward the macro side from the INF-side reference position. This makes it possible to reduce the required stroke.

Patent Literature 2 discloses a camera module including a VCM lens drive device. In this camera module, the position of lenses along the optical axis is adjusted by screwing in a lens barrel.

FIG. 15 is an exploded perspective view of the camera module of Patent Literature 2. In the camera module 201, a lens holder 202 that holds lenses is supported by plate springs 203 and 204. Further, the camera module 201 drives the lens holder 202 along the optical axis of the lenses with use of a coil 205 that is fixed to the lens holder 202 and a magnet 206 that is placed opposite the coil 205. A lens case 207 has a thread 208 formed on an outer circumferential surface (external surface) thereof. The thread 208 engages with a thread formed on an inner circumferential surface of the lens holder 202, and is used for adjusting the position of the lens case 207. The lens case 207 is initially adjusted in such a way as to be at an optimum distance from an image sensor 209.

Accordingly, the present invention has been made in view of the conventional problems, and it is an object of the present invention to provide a camera module and an electronic device both having image pickup lenses positioned with a high degree of accuracy and a lens positioning method that makes it possible to position image pickup lenses with a high degree of accuracy.

Solution to Problem

In order to solve the foregoing problems, a camera module of the present invention is a camera module including: an optical section having image pickup lenses and a lens barrel holding the image pickup lenses; a lens drive section that drives the image pickup lenses from an end at infinity to a macro end along an optical axis; and an image pickup section having an image pickup element that converts, into an electrical signal, incident light having passed through the image pickup lenses, the lens drive section including (a) a movable part, holding the optical section therein, which is capable of moving along the optical axis and (b) a fixed part whose position does not vary when the image pickup lenses are driven, when the lens drive section drives the image pickup lenses to the end at infinity, a reference plane of the optical section and a reference plane of the lens drive section or a reference plane of the image pickup section making contact with each other, the reference plane of the lens drive section being formed on the fixed part.

According to the foregoing invention, when the lens drive section drives the optical section to the end at infinity, the reference plane of the optical section and the reference plane of the lens drive section or the reference plane of the image pickup section make contact with each other. It should be noted here that the position of the fixed part of the lens drive section and the position of the image pickup section do not vary even when the image pickup lenses are driven. That is, the position of the image pickup lenses at the end at infinity is defined by contact between the reference plane of the optical section and the reference plane of the lens drive section or the reference plane of the image pickup section. This makes it possible to eliminate an error in mounting of the image pickup lenses that is accumulated between the fixed part and the movable part of the lens drive section. For this reason, the distance from the image pickup element to the image pickup lenses at the end at infinity (i.e., the focal length) is surely defined. Therefore, the image pickup lenses can be mounted with such a high degree of accuracy that the need for initial focus adjustment is eliminated. This makes it possible to realize a camera module having an image pickup lens positioned with a high degree of accuracy.

In order to solve the foregoing problems, a first lens positioning method of the present invention is a lens positioning method for, in a camera module including (i) an optical section having image pickup lenses and a lens barrel holding the image pickup lenses, (ii) a lens drive section that drives the image pickup lenses from an end at infinity to a macro end along an optical axis, and (iii) an image pickup section having an image pickup element that converts, into an electrical signal, incident light having passed through the image pickup lenses, the lens drive section including (a) a movable part, holding the optical section therein, which is capable of moving along the optical axis and (b) a fixed part whose position does not vary when the image pickup lenses are driven, defining a position of the image pickup section along the optical axis, the end at infinity of the image pickup lenses being defined by bringing a reference plane of the optical section and a reference plane of the lens drive device or a reference plane of the image pickup section into contact with each other, the reference plane of the lens drive section being formed on the fixed part.

According to the foregoing invention, the end at infinity of the image pickup lenses is defined by bringing the reference plane of the optical section and the reference plane of the lens drive device or the reference plane of the image pickup section into contact with each other. It should be noted here that the position of the fixed part of the lens drive section and the position of the image pickup section do not vary even when the image pickup lenses are driven. That is, the position of the image pickup lenses at the end at infinity is defined by contact between the reference plane of the optical section and the reference plane of the lens drive section or the reference plane of the image pickup section. This makes it possible to eliminate an error in mounting of the image pickup lenses that is accumulated between the fixed part and the movable part of the lens drive section. For this reason, the distance from the image pickup element to the image pickup lenses at the end at infinity (i.e., the focal length) is surely defined. Therefore, the image pickup lenses can be mounted with such a high degree of accuracy that the need for initial focus adjustment is eliminated.

In order to solve the foregoing problems, a second lens positioning method of the present invention is a lens positioning method for, in a camera module including (i) an optical section having image pickup lenses and a lens barrel holding the image pickup lenses, (ii) a lens drive section that drives the image pickup lenses from an end at infinity to a macro end along an optical axis, and (iii) an image pickup section having an image pickup element that converts, into an electrical signal, incident light having passed through the image pickup lenses, the lens drive section including (a) a movable part, holding the optical section therein, which is capable of moving along the optical axis and (b) a fixed part whose position does not vary when the image pickup lenses are driven, defining a position of the image pickup section along the optical axis, the lens positioning method including the steps of: adjusting the position of the image pickup lenses with respect to a reference plane of the optical section along the optical axis; bringing the reference plane of the optical section into contact with a reference plane of the lens drive section or a reference plane of the image pickup section, the reference plane of the lens drive section being formed on the fixed part; and fixing the lens barrel to the lens drive device with the lens barrel in contact with the reference plane.

According to the foregoing invention, the end at infinity of the image pickup lenses is defined by bringing the reference plane of the optical section and the reference plane of the lens drive device or the reference plane of the image pickup section into contact with each other. It should be noted here that the position of the fixed part of the lens drive section and the position of the image pickup section do not vary even when the image pickup lenses are driven. That is, the position of the image pickup lenses at the end at infinity is defined by contact between the reference plane of the optical section and the reference plane of the lens drive section or the reference plane of the image pickup section. This makes it possible to eliminate an error in mounting of the image pickup lenses that is accumulated between the fixed part and the movable part of the lens drive section. For this reason, the distance from the image pickup element to the image pickup lenses at the end at infinity (i.e., the focal length) is surely defined. Therefore, the image pickup lenses can be mounted with such a high degree of accuracy that the need for initial focus adjustment is eliminated.

In order to solve the foregoing problems, an electronic device of the present invention includes the camera module described above. Therefore, an electronic device including a camera module having image pickup lenses positioned with a high degree of accuracy can be provided. Examples of the electronic device include image pickup devices such as camera-equipped mobile phones, digital still cameras, and security cameras.

Advantageous Effects of Invention

As described above, the camera module of the present invention is configured such that when the lens drive section drives the image pickup lenses to the end at infinity, the reference plane of the optical section and the reference plane of the lens drive section or the reference plane of the image pickup section make contact with each other. This brings about an effect of making it possible to mount the image pickup lenses with such a high degree of accuracy that the need for initial focus adjustment is eliminated, thus bringing about an effect of making it possible to realize a camera module having image pickup lenses positioned with a high degree of accuracy.

For a fuller understanding of the nature and advantages of the invention, reference should be made to the ensuing detailed description taken in conjunction with the accompanying drawings.

BRIEF DESCRIPTION OF DRAWINGS

FIG. 1 is a perspective view showing a camera module of the present invention.

FIG. 2 is a cross-sectional view of the camera module of FIG. 1 taken along the line A-A.

FIG. 3 is a perspective view showing optical and image pickup sections of the camera module of FIG. 1.

FIG. 4 is a cross-sectional view of the camera module of FIG. 2 taken along the line B-B.

FIG. 5 is a perspective view showing another example of the optical and image pickup sections of the camera module of FIG. 1.

FIG. 6 is a cross-sectional view of another camera module of the present invention taken along a line on the center thereof.

FIG. 7 is a cross-sectional view of another camera module of the present invention taken along a line on the center thereof.

FIG. 8 is a cross-sectional view of another camera module of the present invention taken along a line on the center thereof.

FIG. 9 is a cross-sectional view of another camera module of the present invention taken along a line on the center thereof.

FIG. 10 is a cross-sectional view of another camera module of the present invention taken along a line on the center thereof.

FIG. 11 is a cross-sectional view of another camera module of the present invention taken along a line on the center thereof.

FIG. 12 explains a method for positioning lenses in a camera module of the present invention.

FIG. 13 explains another method for positioning lenses in a camera module of the present invention.

FIG. 14 is a flow chart showing a lens positioning method of the present invention.

FIG. 15 is an exploded perspective view of a camera module of Patent Literature 2.

FIG. 16 is a cross-sectional view of another camera module of the present invention taken along a line on the center thereof.

FIG. 17 is a cross-sectional view of another camera module of the present invention taken along a line on the center thereof.

FIG. 18 is a cross-sectional view of another camera module of the present invention taken along a line on the center thereof.

FIG. 19 is a cross-sectional view of another camera module of the present invention taken along a line on the center thereof.

FIG. 20 is a cross-sectional view of another camera module of the present invention taken along a line on the center thereof.

DESCRIPTION OF EMBODIMENTS

One embodiment of the present invention is described below with reference to FIGS. 1 through 14 and FIGS. 16 through 20.

Figure 1:
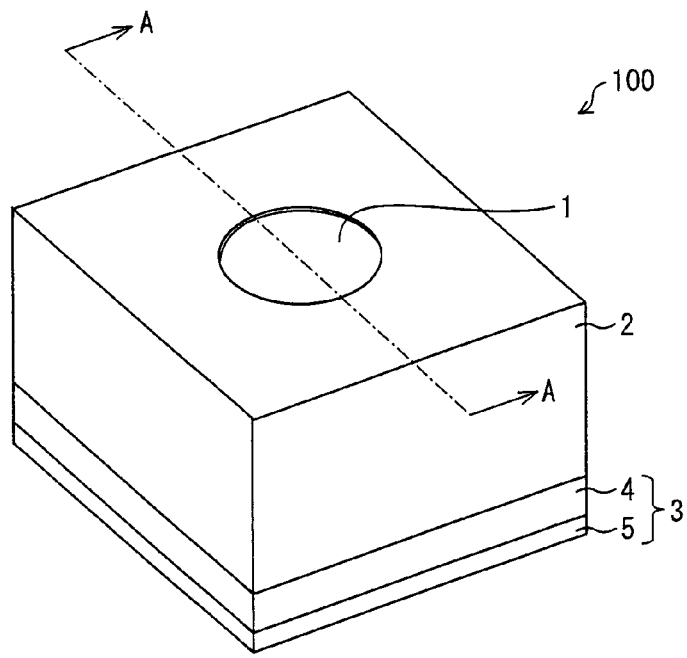
FIG. 1

FIG. 1 is a perspective view of a camera module of the present embodiment. The camera module 100 is constituted by: an optical section 1, which serves as an image pickup optical system; a lens drive device (lens drive section) 2, which drives the optical section 1; and an image pickup section 3, which performs photoelectric conversion of light having passed through the optical section 1. The optical section 1 is held inside of the lens drive device 2. The image pickup section 3 is constituted by a sensor section 4 and a substrate 5 on which the sensor section 4 is mounted. The camera module 100 is configured to have the sensor section 4 and the lens drive device 2 stacked on the substrate 5 in this order along the optical axis. For the sake of convenience, the following description assumes that the optical section 1 is on the upper side and the image pickup section is on the lower side.

Figure 2:
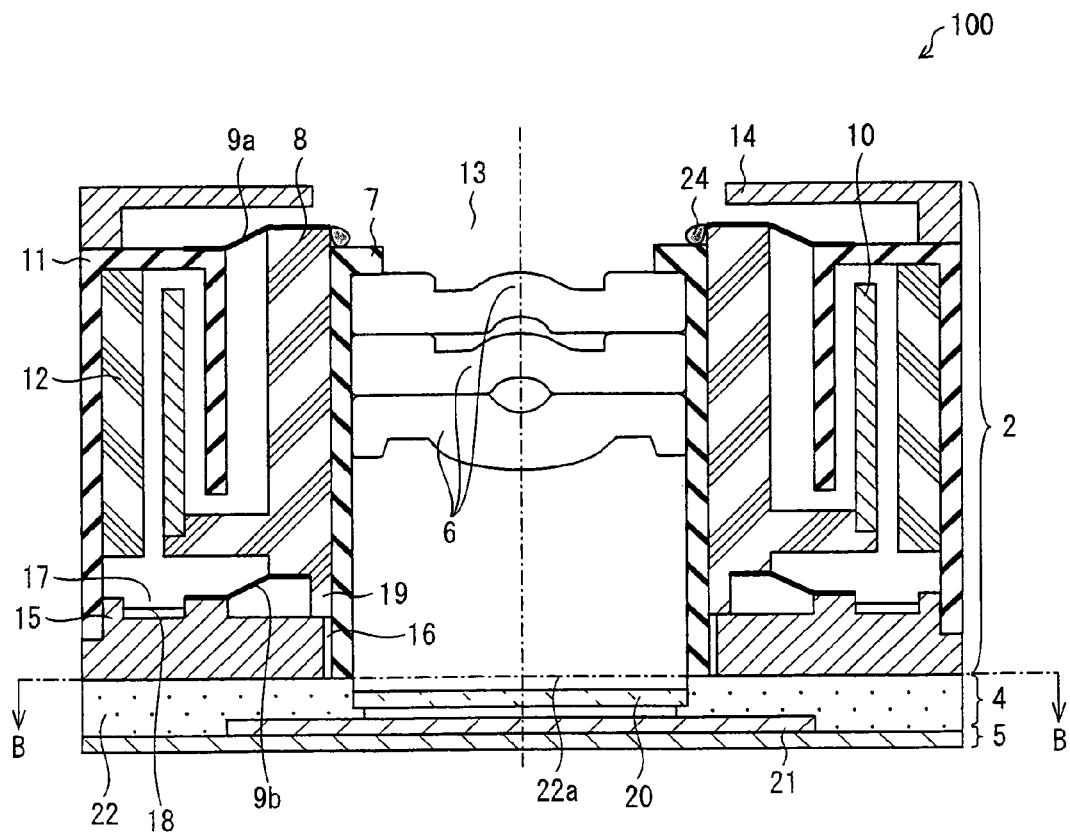
FIG. 2

First, the overall structure of the camera module 100 is described with reference to FIG. 2. FIG. 2 is a cross-sectional view of the camera module of FIG. 1 taken along the line A-A, and is a cross-sectional view obtained by cutting the central part of the camera module along the optical axis.

The optical section 1 is an image pickup optical system that forms a subject image, and guides external light toward the sensor section 4 of the image pickup section 3. The optical section 1 is constituted by a plurality of image pickup lenses 6 (three in FIG. 2) and a lens barrel 7 holding the image pickup lenses 6. The lens barrel 7 is fixed to the lens drive device 2. The optical axis of the image pickup lenses 6 coincides with the center of axle of the lens barrel 7.

The lens drive device 2 drives the optical section 1 along the optical axis by means of electromagnetic force. That is, the lens drive device 2 moves up and down the image pickup lenses 6 between an end at infinity and a macro end. This allows the camera module 100 to fulfill its automatic focusing function. The lens drive device 2 mounted in the camera module 100 is of a VCM type.

The lens drive device 2 includes (a) a movable part that moves the optical section 1 (i.e., the image pickup lenses 6) along the optical axis by moving along the optical axis when the image pickup lenses 6 are driven and (b) a fixed part whose position does not vary when the image pickup lenses 6 are driven. The movable part is housed inside of the fixed part. The movable part is constituted by a lens holder 8 and a coil 10, and the fixed part is constituted by a yoke 11, a permanent magnet 12, a cover 14, and a base 15.

Specifically, the lens drive device 2 is configured in such a way that the lens holder 8 holding the lens barrel 7 inside thereof is housed in a space formed by the base 15, the yoke 11, and the cover 14.

The lens holder 8 holds inside thereof the lens barrel 7 holding the image pickup lenses 6. The lens barrel 7 and the lens holder 8 are both hollow (cylindrical) members. In the camera module 100, an external surface of the lens barrel 7 and an internal surface of the lens holder 8 are not threaded and therefore are flat. That is, the lens barrel 7 and the lens holder 8 have no threads formed on their respective surfaces of contact with each other.

The inside diameter of the lens holder 8 is slightly larger than the outside diameter of the lens barrel 7 so that the lens barrel 7 is mounted in the center of the lens holder 8. The center of axle of the lens holder 8 coincides with the optical axis of the image pickup lenses 6 and the center of axle of the lens barrel 7. The lens holder 8 and the lens barrel 7 are fixed to each other with an adhesive 24. The adhesive 24 is preferably realized, for example, by a thermosetting UV adhesive or an anaerobic UV adhesive, whereby that portion of the adhesive 24 which is filling a gap between the lens holder 8 and the lens barrel 7 can be thermally cured or anaerobically cured. Meanwhile, that portion of the adhesive 24 which is forming a fillet raised above the surface can be UV cured. For the purpose of application of the adhesive 24, the lens holder 8 and the lens barrel 7 may each have an adhesive-collecting groove in a portion thereof. In the present invention, since the lens barrel 7 does not need to be screwed into the lens holder 8, the grooves respectively formed in the lens holder 8 and the lens barrel 7 do not get out of their positional relationship with each other, whereby a wider pool of adhesive can be formed.

The coil 10 is fixed on an outer circumferential edge (flange) of the lens holder 8. The coil 10 is provided in such a way as to extend from a dead end (bottom portion) of the lens holder 8 to a side upon which light is incident (i.e., to an aperture 13 to be described later).

The base 15 constitutes a bottom portion of the lens drive device 2, and the sensor section 4 is provided on a rear surface of the base 15. The base 15 has an aperture 16 so formed in the central part thereof as to secure a light path.

The yoke 11 is a tubular member, and constitutes a side surface portion of the lens drive device 2. The yoke 11 houses the movable part inside thereof. The yoke 11 is fixed on the base 15. In the present embodiment, the cover 14 is provided above the yoke 11. The cover 14 constitutes an upper portion (i.e., a head surface) of the lens drive device 2. The cover 14 has an aperture 13 so formed in the central part thereof as to secure a light path. The cover 14 may be omitted when the yoke 11 plays a role as a cover, in which case the aperture 13 is formed in the yoke 11.

Disposed on an internal surface of the yoke 11 in such a way as to face the coil 10 is a magnetic circuit composed of the permanent magnet 12.

The lens drive device 2 drives the image pickup lenses 6 along the optical axis by means of electromagnetic force generated by the coil 10 and the permanent magnet 12. Specifically, the present embodiment makes it possible to drive the image pickup lenses 6 (i.e., the lens holder 8) along the optical axis by means of force generated by passing an electrical current through the coil 10 in a magnetic field formed by the permanent magnet 12.

Further, the lens drive device 2 of the present embodiment has plate springs 9a and 9b provided on upper and lower surfaces (i.e., head and bottom surfaces) of the lens holder 8, respectively. The plate springs 9a and 9b press the lens holder 8 along the optical axis. That is, the plate springs 9a and 9b have the elasticity to supplementarily support the lens holder 8 so that the lens holder 8 can move along the optical axis. The plate springs 9a and 9b each have a spiral pattern. In the present embodiment, the plate springs 9a and 9b each have one end fixed to the yoke 11 or the base 15 and the other end to the lens holder 8. However, the plate springs 9a and 9b only need to each have one end fixed to the movable part and the other end to the fixed part.

As shown in FIG. 2, in a state of assembly of the camera module 100, the lens holder 8 is preloaded downward by the elasticity of the plate springs 9a and 9b while a protruding portion 19 formed on the bottom surface of the lens holder 8 is making contact with the base 15.

Furthermore, the lens drive device 2 has a groove 17 formed on an upper surface of the base 15 (i.e., that surface of the base 15 which is facing the bottom surface of the lens holder 8) in such a way as to be located nearly directly below the permanent magnet 12 and the coil 10, and the groove 17 has an adhesive dust-trapping agent 18 applied therein. The dust-trapping agent 18 only needs to be formed on the upper surface of the base 15, but is preferably applied in the groove 17. This allows the dust-trapping agent 18 to catch foreign bodies having moved onto the upper surface of the base 15. Therefore, the foreign bodies can be surely prevented from exiting through the aperture 16, through which light exits. Furthermore, application of the dust-trapping agent 18 to the groove 17 allows accumulation of foreign bodies in the groove 17. That is, foreign bodies having fallen onto the base 15 via the gap can be accumulated in the groove 17 immediately after the falling.

That is, the lens drive device 2 has the dust-trapping agent 18 applied onto the base 15 in such a way as to be located nearly directly below the coil 10 and the permanent magnet 12. For this reason, if foreign bodies having passed through the gap between the coil 10 and the permanent magnet 12 fall directly, they fall onto the dust-trapping agent 18, whereby the dust-trapping agent 18 catches the foreign bodies.

The dust-trapping agent 18 is not particularly limited as long as it is adhesive, but can be realized, for example, by semisolid (or nearly solid) fat oil or resin, preferably such as grease. The grease is a semisolid (or nearly solid) type of fat oil, and can be constituted, for example, by a paste lubricant. The grease can be realized, for example, by a molybdenum disulfide-based lubricant, a white lubricant, a silicone-based lubricant, or a perfluoropolyether-based lubricant. Further, the grease can be realized, for example, by mineral oil-based grease composed mainly of mineral oil, poly-α-olefin-based grease composed mainly of poly-α-olefin oil, silicone-based grease composed mainly of silicone oil, fluorosilicone-based grease, perfluoropolyether-based grease composed mainly of perfluoropolyether. These types of grease can be used alone or in combination of two or more of them. Further, the grease may contain additives for grease such as lithium soap, calcium soap, and polytetrafluoroethylene (PTFE).

Next, the image pickup section 3, provided on a bottom surface of the lens drive device 2 (i.e., on a bottom surface of the base 15), performs photoelectric conversion of incident light coming from the optical section 1. The image pickup section 3 is constituted by the sensor section 4 and the substrate 5 on which the sensor section 4 is mounted. The sensor section 4 is constituted by a glass substrate 20, a sensor chip 21, and a sensor cover 22 in such a way as to be fixed on the substrate 5.

The sensor chip 21 is an image pickup element that converts, into an electrical signal, a subject image formed in the lens drive device 2, i.e., a sensor device that converts, into an electrical signal, an optical signal received through the image pickup lenses 6 of the lens drive device 2. The sensor chip 21 is for example a CCD or a CMOS sensor IC. The sensor chip 21 has a light-receiving section (not shown), formed on a surface (upper surface) thereof, which has a plurality of pixels arranged in a matrix manner. The light-receiving section is a region where an image of light coming from the lens drive device 2 is formed, and as such, can be referred to also as a pixel area.

The sensor chip 21 converts, into an electrical signal, a subject image formed in the light-receiving section (pixel area), and then outputs it as an analog image signal. That is, photoelectric conversion is performed in the light-receiving section. Operation of the sensor chip 21 is controlled by a DSP (not shown), and the image signal produced in the sensor chip is processed by the DSP.

The sensor cover 22 is configured to cover portion of the sensor chip 21. The sensor cover 22 covers the sensor chip 21 in such a way as to avoid the light-receiving section of the sensor chip 21. The sensor cover 22 has an aperture 22a so formed as to secure a light path. The area of the aperture 22a is larger than the area of the light-receiving section of the sensor chip 21 and the area of a surface of the glass substrate 20. This allows the light-receiving section of the sensor chip 21 and the glass substrate 20 to be disposed within the aperture 22a. The aperture 22a serves as a light-transmitting region through which light coming through the image pickup lenses 6 is transmitted to the light-receiving section of the sensor chip 21.

As for the sensor cover 22, the distance from a light-receiving surface (upper surface) of the sensor chip 21 to an upper surface of the sensor cover 22 is managed with a high degree of accuracy. A lower reference plane (rear surface) of the sensor cover 22 is a surface that is mounted on the sensor chip 21, and a gap may be formed between that surface of the sensor cover 22 which is facing the substrate 5 and the substrate 5.

The glass substrate 20, covering the light-receiving section of the sensor chip 21, is constituted by a transparent member. The present embodiment has an infrared blocking film (IR protection film) formed on the surface of the glass substrate 20, thus endowing the glass substrate 20 with a function of blocking infrared radiation. The glass substrate 20 may be mounted on the sensor cover 22, or may be fixed on the sensor chip 21 in such a way as to be put on top of the sensor chip 21 via an adhesive. In FIG. 2, the glass substrate 20 is mounted on the sensor cover 22 at a distance from the sensor chip 21. It is desirable that there be such a distance from the sensor chip 21, because such a distance reduces the degree of influence of foreign bodies having adhered onto the glass substrate 20 (i.e., reduces the reflection of the foreign bodies on the sensor).

The substrate 5 has a patterned wire (not shown). This wire allows the substrate 5 and the sensor section 4 (i.e., the sensor chip 21) to be electrically connected to each other. The substrate 5 is for example a printed board or a ceramic substrate.

Thus, in the image pickup section 3, an optical signal having entered the sensor chip 21 is subjected to photoelectric conversion. Then, the resultant electrical signal is inputted to a control circuit (not shown) of the camera module and the like through the substrate 5, and is taken out as an image signal.

Since the camera module 100 includes the lens drive device 2, the camera module 100 has an automatic focusing function. For this reason, it is especially important to define the focal length of the image pickup lenses 6 (the distance from the light-receiving surface of the sensor chip 21 to the image pickup lenses 6) with a high degree of accuracy.

Accordingly, in the camera module 100, as shown in FIG. 2, the position of contact between a reference plane of the optical section 1 and a reference plane of the image pickup section 3 is defined as the end at infinity of the image pickup lenses 6. Specifically, the image pickup lenses 6 are fixed to the lens holder 8 so that the bottom surface of the lens barrel 7 (i.e., the reference plane of the optical section 1) makes contact with the lens cover 22 with the movable part of the lens drive device 2 being located at a reference (INF-side mechanical end) upon which the side at infinity (lower side of FIG. 2) is based.

That is, as shown in FIG. 2, when the lens drive device 2 drives the optical section 1 to the end at infinity (INF-side mechanical end), the bottom surface of the lens barrel 7 makes contact with the surface of the sensor cover 22. That is, in the camera module 100, the reference plane of the optical section 1 is the bottom surface of the lens barrel 7, and the reference plane of the image pickup section 3 is the surface of the sensor cover 22. Further, as will be mentioned later, at the end at infinity (INF-side mechanical end), the bottom portion of the lens barrel 7 passes through the aperture 16 of the base 15 of the lens drive device 2 to make contact with the sensor cover 22. Moreover, the rear surface (lower surface) of the sensor cover 22 is in contact with the light-receiving surface, at which the focal length begins, of the sensor chip 22. According to this, an error in focal length is only caused by a variation in thickness of the sensor cover 22 (thickness from that surface of the sensor cover 22 which is in contact with the sensor chip 21 <lower reference plane> to that surface of the sensor cover 22 which is in contact with the lens barrel 7 <reference plane of the image pickup section 3>) and a variation in mounting location of the image pickup lenses 6 with respect to the reference plane (bottom surface) of the lens barrel 7. This makes it possible to mount the image pickup lenses 6 with a very high degree of accuracy. This eliminates the need for initial focus adjustment of the image pickup lenses 6, thus making it unnecessary to search for a focused focal position on the INF side.

Further, since the reference upon which the end at infinity is based is in contact with the bottom surface of the lens barrel 7 and the surface of the sensor cover 22, it is not necessary to provide an extra stroke on the side of the end at infinity to eliminate an error in focal length. That is, there only needs to be a stroke to drive the image pickup lenses 6 toward the macro side from such an end at infinity (INF-side position). This makes it possible to reduce the required stroke.

The end at infinity (INF mechanical end) may be set to incline to over infinity. That is, in some cases, the camera module 100 has an error in positioning of the lens barrel 7, a tolerance of each member, or the like. In cases where the end at infinity is not set at over infinity, such an error or tolerance is not taken into consideration. That is, the end at infinity is in an optically optimum position at infinity (focused focal position).

Meanwhile, in cases where the end at infinity is set at over infinity, such an error or tolerance is taken into consideration. That is, in such a case, the end at infinity is set farther (toward the sensor chip 21) than in cases where the end at infinity is not set at over infinity. For this reason, even in cases where there is such an error or tolerance, the error or tolerance can be absorbed by the end at infinity by driving the lens barrel 7.

Figure 3:
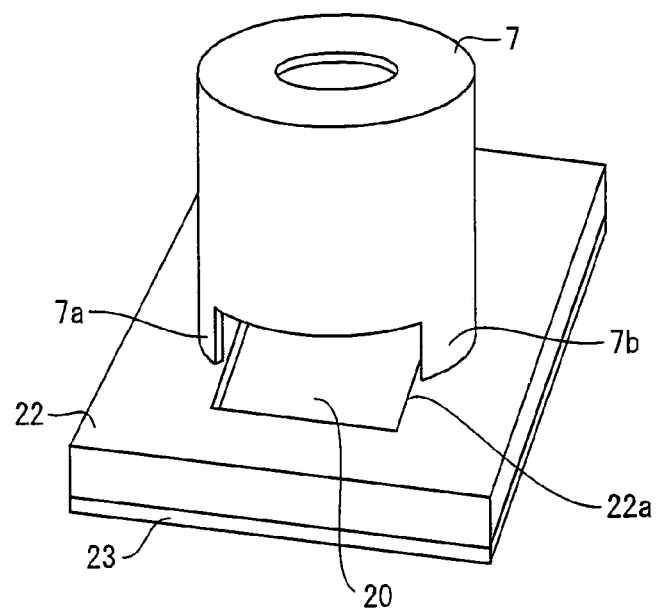
FIG. 3
Figure 4:
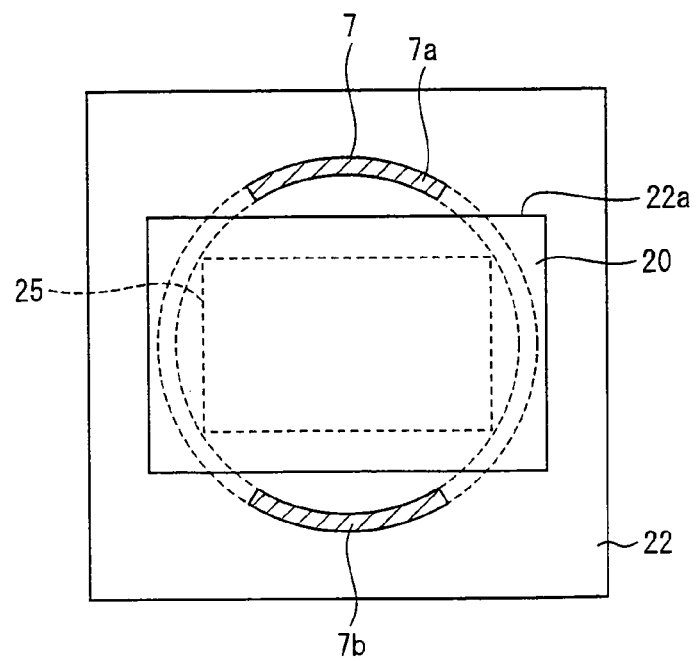
FIG. 4

Next, the shape of the lens barrel 7, the positional relationship between the sensor cover 22 and the glass substrate 20, and the like are described in more detail with reference to FIGS. 3 and 4. FIG. 3 is a perspective view showing the optical and image pickup sections 1 and 3 of the camera module 100 of FIG. 1. FIG. 4 is a cross-sectional view of the camera module 100 of FIG. 2 taken along the line B-B, and is a cross-sectional view obtained by cutting the base 15 (i.e., the sensor cover 22) of the camera module 100 along the optical axis (indicated by a dashed line in the drawing) in a vertical direction. It should be noted that FIG. 4 omits the lens drive device 2.

As shown in FIG. 3, in the camera module 100, the bottom portion of the lens barrel 7 has a portion removed. Specifically, at the end at infinity, the bottom portion of the lens barrel 7 has cuts made therein to overlap the aperture 22a, thus making contact with a portion of the sensor cover 22 outside of the aperture 22a. That is, the bottom portion of the lens barrel 7 is provided with protruding portions 7a and 7b that make contact with the sensor cover 22 and U-shaped cuts, made in the lens barrel 7, which make no contact with the sensor cover 22. For this reason, not all of the bottom portion of the lens barrel 7 makes contact with the sensor cover 22. That is, the lens barrel 7 makes contact with the sensor cover 22 outside of the light-transmitting region, but does not make contact with the sensor cover 22 inside of the light-transmitting region. This makes it possible to reduce the weight of the lens barrel 7, and to prevent optical vignetting by removing unneeded walls.

Further, as shown in FIG. 3, the upper surface of the glass substrate 20 disposed within the aperture 22a is located below the upper surface of the sensor cover 22. This eliminates concerns over interference with the glass substrate 20.

Meanwhile, as shown in FIG. 4, the surface of contact between the lens barrel 7 and the sensor cover 22 is separated into two: a bottom surface of the protruding portion 7a and a bottom surface of the protruding portion 7b. This makes it easy to exhibit the accuracy of positioning by making contact with the surface of the sensor cover 22. Further, as evidenced by FIG. 4, the protruding portions 7a and 7b of the lens barrel 7 are in contact with the sensor cover 22, thus eliminating planar interference with the glass substrate 20, too.

The light from the image pickup lenses 6 enters the sensor chip 21 with slight diffusion. For this reason, when the bottom portion (foot portion) of the lens barrel 7 is long to make contact with the sensor cover 22, the light undesirably strikes an inner surface of the lens barrel 7, which may cause vignetting as a result. As shown in FIG. 4, the light-receiving section (light-entering region) 25, which is necessary for image pickup, of the sensor chip 21 has a rectangular shape, and the optical section is designed to cover the light-receiving section 25. For this reason, there is some room along the sides. Accordingly, the protruding portions 7a and 7b are provided along the sides so that the image pickup performance is not affected even if vignetting is caused by light striking inner surfaces of the protruding portions 7a and 7b.

Figure 5:
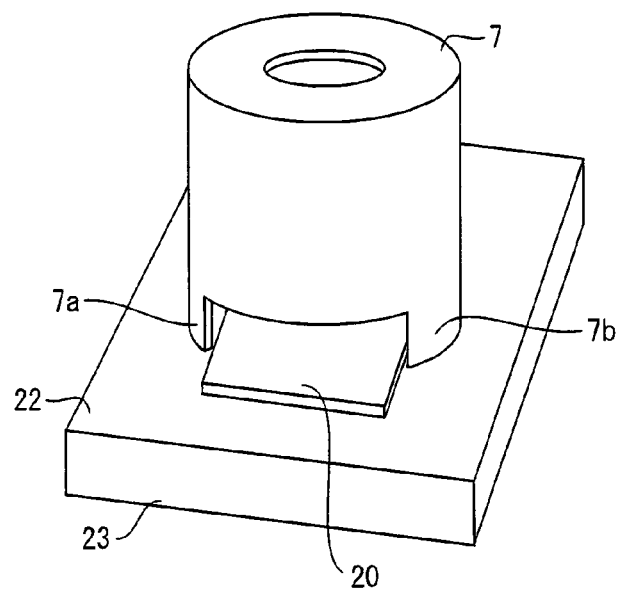
FIG. 5

Meanwhile, as shown in FIG. 5, the upper surface of the glass substrate 20 disposed within the aperture 22a may protrude from the sensor cover 22 toward the image pickup lenses 6 (upward). As mentioned above, the glass substrate 20 becomes more resistant to foreign bodies when disposed at a distance from the sensor chip 21. For that purpose, such a configuration is desirable that the glass substrate 20 is placed on the sensor cover 22 at a distance from the sensor chip 21. In this case, there may be a case where the upper surface of the glass substrate 20 is in a higher position than the upper surface of the sensor cover 22. In this case, a space (U-shaped) large in amount of protrusion than the glass substrate 20 is provided by removing the lens barrel 7. This prevents the lens barrel 7 from making contact with the glass substrate 20. This makes it possible to surely cause the surface of the sensor cover 22 to make contact with the bottom surface of the lens barrel 7. Moreover, this lowers the risk of breakage of the glass substrate 20 due to a collision between the lens barrel 7 and the glass substrate 20.

As described above, in the camera module 100, when the lens drive device 2 drives the optical section 1 to the end at infinity, the bottom surface of the lens barrel 7 makes contact with the surface of the sensor cover 22 whose position does not vary even when the image pickup lenses 6 are driven. That is, the position of the image pickup lenses 6 at the end at infinity is defined with the surface of the sensor cover 22, on which the lens drive device 2 is mounted, as the reference plane of the image pickup section 3. This makes it possible to eliminate an error in mounting of the image pickup lenses 6 that is accumulated between the fixed part and the movable part of the lens drive device 2. Therefore, the image pickup lenses 6 can be mounted with such a high degree of accuracy that the need for initial focus adjustment is eliminated.

The camera module 100 of the present embodiment can be configured as follows. FIGS. 6 through 11 and FIGS. 16 through 20 are cross-sectional views of other camera modules 101 to 106 and 107 to 111, respectively. The camera modules 101 to 111 differ in how the image pickup lenses 6 are positioned. The following mainly explains differences between the camera module 100 and the camera modules 101 to 111.

Figure 19:
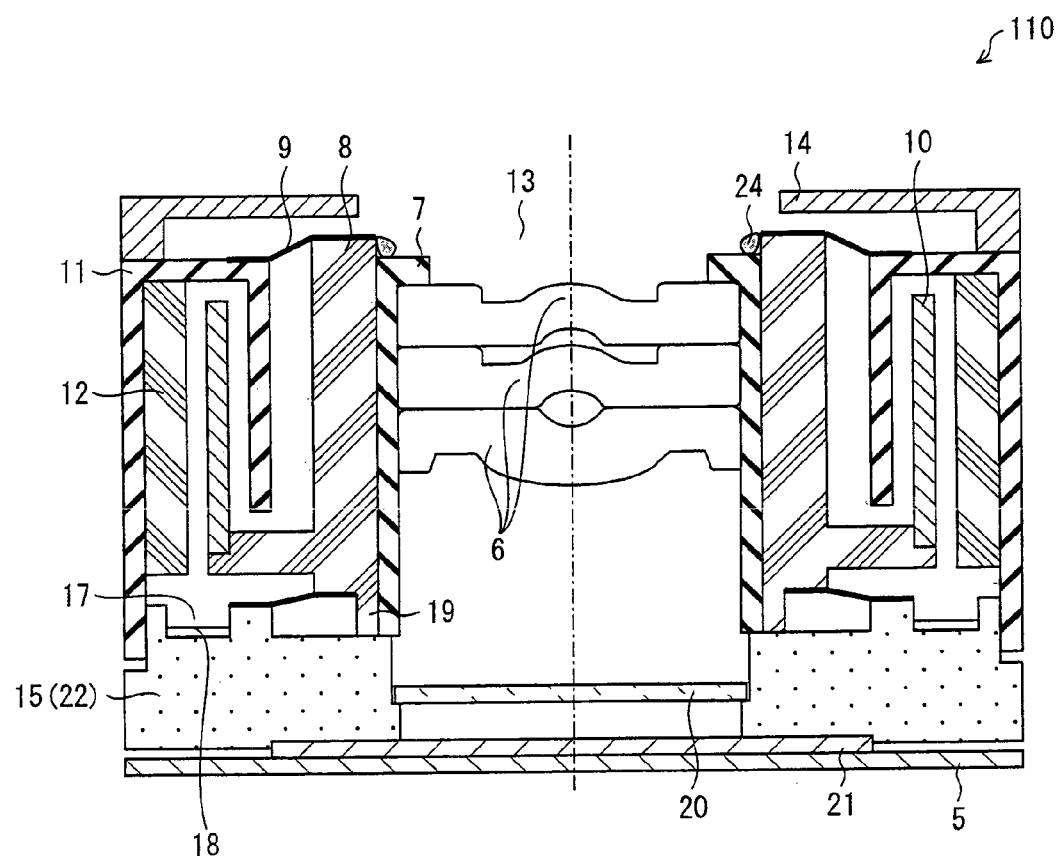
FIG. 19

In the camera module 110 of FIG. 19, the base 15 and the sensor cover 22 are formed integrally from the same member. That is, the sensor cover 22 serves also as the base 15 of the lens drive device 2. The formation of the sensor cover 22 and the base 15 as a common member allows a reduction in number of components and a reduction in cost. Further, in the camera module 110, the sensor cover 22 is provided with the reference plane of the lens drive device 2 as well as the reference plane of the image pickup section 3. That is, at the end at infinity, the bottom surface of the lens barrel 7 and the bottom surface of the lens holder 8 are both in contact with the upper surface of the sensor cover 22. Further, the position of the image pickup lenses 6 at the end at infinity is defined with the surface of the sensor cover 22 as the reference plane of the image pickup section 3. According to this, an error in focal length is only caused by a variation in thickness of the sensor cover 22 and an error in mounting of the image pickup lenses 6 in the lens barrel 7. That is, an error in mounting of the image pickup lenses 6 that is accumulated between the fixed part and the movable part of the lens drive device 2 can be eliminated. Therefore, the image pickup lenses 6 can be mounted with such a high degree of accuracy that the need for initial focus adjustment is eliminated.

Figure 20:
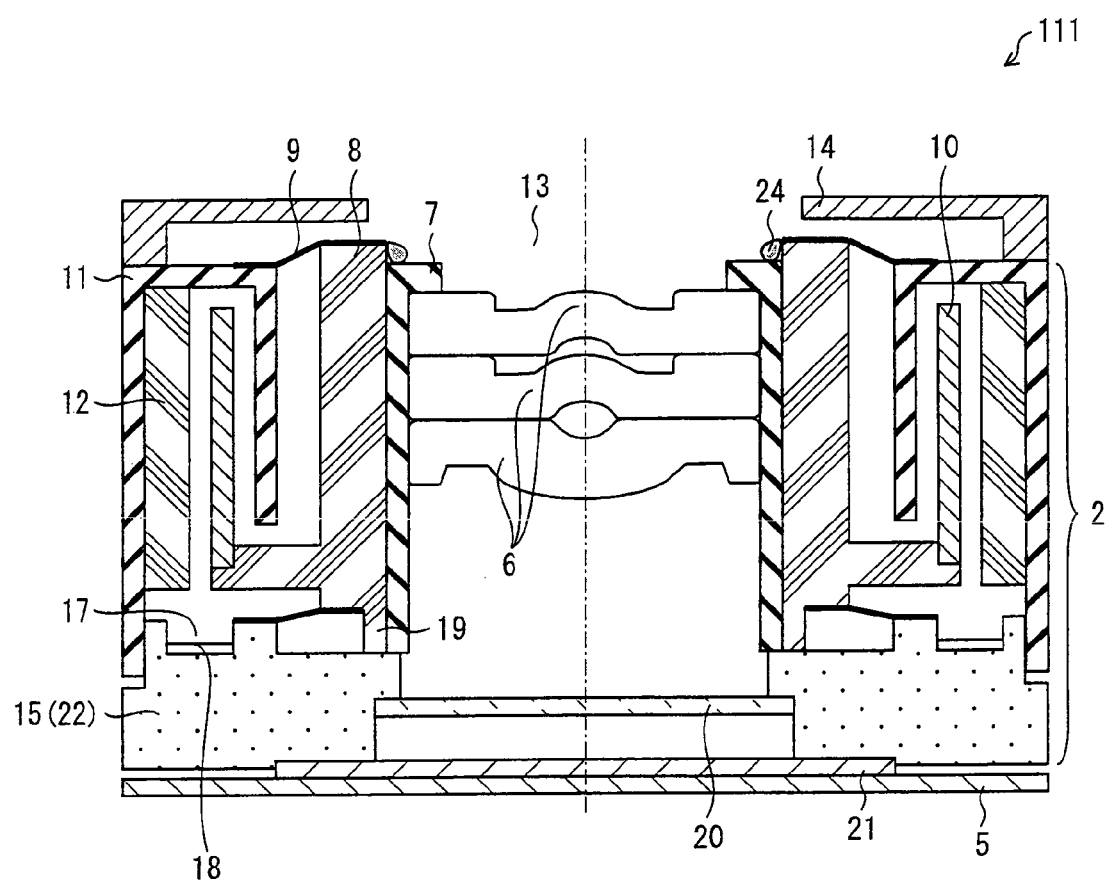
FIG. 20

Meanwhile, in the camera module 111 of FIG. 20, the base 15 and the sensor cover 22 are integrated, as in the camera module 110 of FIG. 19. However, in the camera module 111, the glass substrate 20 has a surface facing the image pickup lenses 6 and bonded to the base 15 integrated with the sensor cover 22, whereby the glass substrate 20 can be bonded to the base 15 (i.e., the sensor cover 22) after assembly of the lens drive device 2. For this reason, the glass substrate 20 is not damaged during assembly of the lens drive device 20. This improves workability in assembly of the lens drive device 2.

Furthermore, the lens drive device 2 can be cleansed before bonding of the glass substrate 20. This makes it possible to bond the glass substrate 20 to the base 15 after removing foreign bodies generated during assembly of the lens drive device 2 and present in the lens drive device 2.

Figure 6:
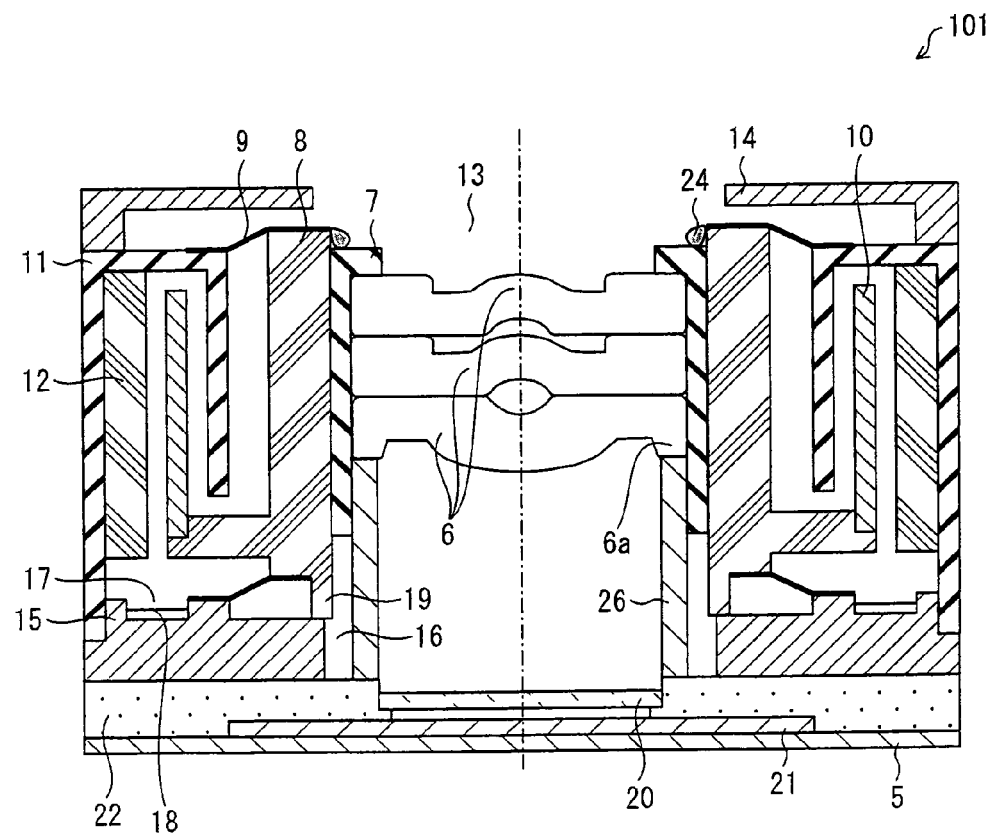
FIG. 6

Next, in the camera module 101 of FIG. 6, the position of the image pickup lenses 6 at the end at infinity is defined by contact of a bottom surface of a retainer 26, formed on an edge portion 6a of the image pickup lenses 6, with the surface of the sensor cover 22.

The retainer 26 extends downward from the edge portion 6a of the image pickup lenses 6 along the sides of the lens barrel 7. The retainer 26, fitted into the lens barrel 7, extends to the sensor cover 22 over the lens barrel 7.

The retainer 26 is originally a member for pinning the image pickup lenses 6 fitted into the lens barrel 7. Moreover, when fixed to the lens barrel 7 with an adhesive, the retainer 26 is driven integrally with the lens barrel 7 while fixing the image pickup lenses 6.

A conventional retainer is housed in a lens barrel. Meanwhile, in the camera module 101 of the present embodiment, the retainer 26 is provided in such a way as to extend to a position of contact with the sensor cover 22 over the bottom surface of the lens barrel 7 for the purpose of adjusting the height of the lens barrel 7. That is, the reference plane of the lens barrel 7 (i.e., the reference plane of the optical section 1) becomes the bottom surface (lower surface) of the retainer 26.

As will be mentioned later, in the case of need to adjust the position of the image pickup lenses 6 with respect to the lens barrel 7, it is only necessary to regulate the thickness of the retainer 26. Further, in the case of molding of retainers 26 with use of a plurality of cavities different from one another, there are of course variations in dimensions. However, the height of the image pickup lenses 6 can be adjusted by selecting a retainer 26 of the optimum height within the range of such variations.

In FIG. 6, the lower surface of the retainer 26 is entirely flat. However, the retainer 26 may have a portion removed, as with the lens barrel 7 of FIG. 1.

In the camera module 101, when the image pickup lenses 6 are driven to the end at infinity, the bottom surface of the retainer 26 formed on the edge portion 6a of the image pickup lenses 6 makes contact with the sensor cover 22, whereby the position of the image pickup lenses 6 at the end at infinity is defined with the image pickup lenses 6, which serve as a reference upon which the focal length is based, as the reference plane of the optical section 1. Therefore, the image pickup lenses 6 can be mounted with a higher degree of accuracy.

The edge portion 6a of the image pickup lenses 6 is a portion that does not contribute to image pickup, and as such, does not exert any influence on actual image pickup.

Figure 7:
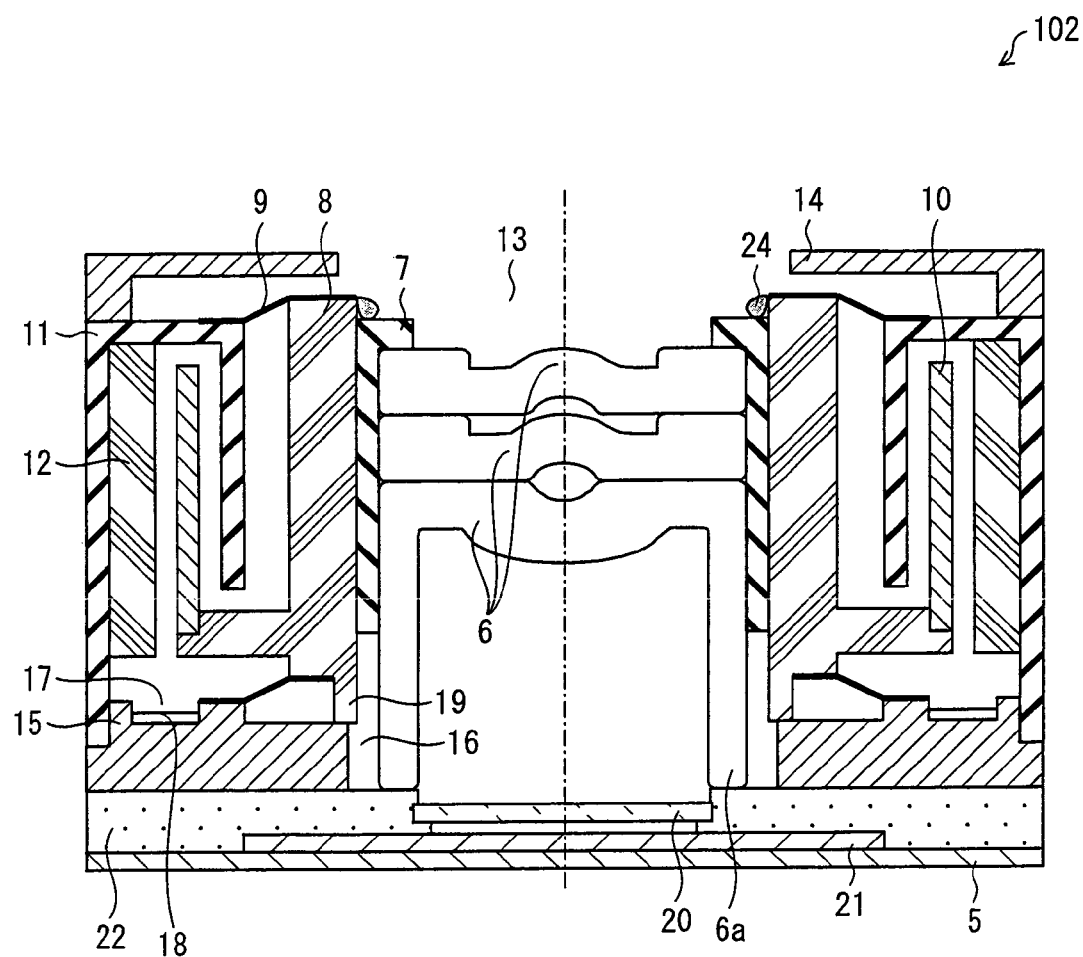
FIG. 7

Next, in the camera module 102 of FIG. 7, the position of the image pickup lenses 6 at the end at infinity is defined by contact of the bottom surface of the edge portion 6a of the image pickup lenses 6 with the sensor cover 22. The camera module 102 of FIG. 7 can be said to be configured by replacing the retainer 26 of the camera module 101 of FIG. 6 with the edge portion 6a.

That is, the edge portion 6a is provided in such a way as to extend to a position of contact with the sensor cover 22 over the bottom surface of the lens barrel 7 for the purpose of adjusting the height of the lens barrel 7. That is, the reference plane of the lens barrel 7 (i.e., the reference plane of the optical section 1) becomes the bottom surface (lower surface) of the edge portion 6a.

In the camera module 102, there is no such retainer or lens holder 8 as located intermediately, and the height of the image pickup lenses 6 is determined by the accuracy of the image pickup lenses 6. For this reason, there is only a little accumulation of error variations in focal length, and the height of the image pickup lenses 6 can be set with a high degree of accuracy.

In FIG. 7, the lower surface of the edge portion 6a is entirely flat. However, the edge portion 6a may have a portion removed, as with the lens barrel 7 of FIG. 1.

Figure 8:
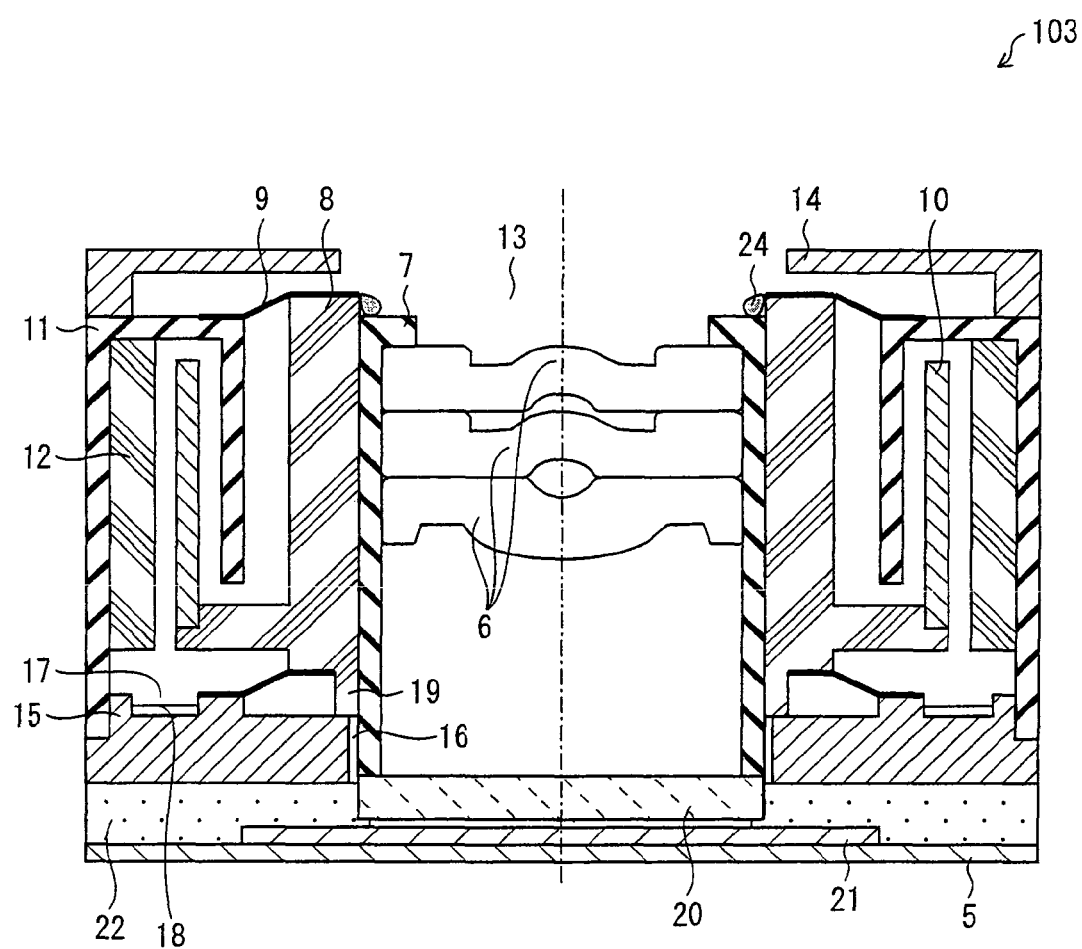
FIG. 8

Next, in the camera module 103 of FIG. 8, the position of the image pickup lenses 6 at the end at infinity is defined by contact of the bottom surface of the lens barrel 7 with the glass substrate 20.

In cases where the glass substrate 20 is superior in thickness accuracy than the sensor cover 22, it is more preferable to bring the bottom surface of the lens barrel 7 into contact with the glass substrate 20 than with the sensor cover 22. This makes it possible to define the position of the image pickup lenses 6 at the end at infinity with a higher degree of accuracy.

At the end at infinity, the bottom surface of the lens barrel 7 makes contact with the glass substrate 20 at the same time as the bottom surface of the lens holder 8 of the lens drive device 2 makes contact with the base 15. However, the contact of the lens barrel 7 with the glass substrate 20 poses a risk of a shock that does damage to the glass substrate 20. Accordingly, in order to alleviate the shock, a shock-absorbing member (not shown) may be provided on at least either the bottom surface of the lens barrel 7 or the surface of the sensor cover 22, i.e., on the surface of contact therebetween, whereby the shock-absorbing member can absorb the shock. Therefore, damage of the glass substrate 20 due to a shock can be prevented. Because deterioration in thickness accuracy due to such a shock-absorbing member is unfavorable, it is necessary to use a shock-absorbing member high in thickness accuracy. The shock-absorbing member is not particularly limited, but can be constituted, for example, by a rubber-based material. For example, the shock-absorbing member can be realized by a sheet of silicone rubber.

In FIG. 8, the lens barrel 7 and the glass substrate 20 are in contact with each other. However, as in FIG. 6 or FIG. 7, the retainer 26 or the edge portion 6a of the image pickup lenses 6 may make contact with the glass substrate 20.

Figure 9:
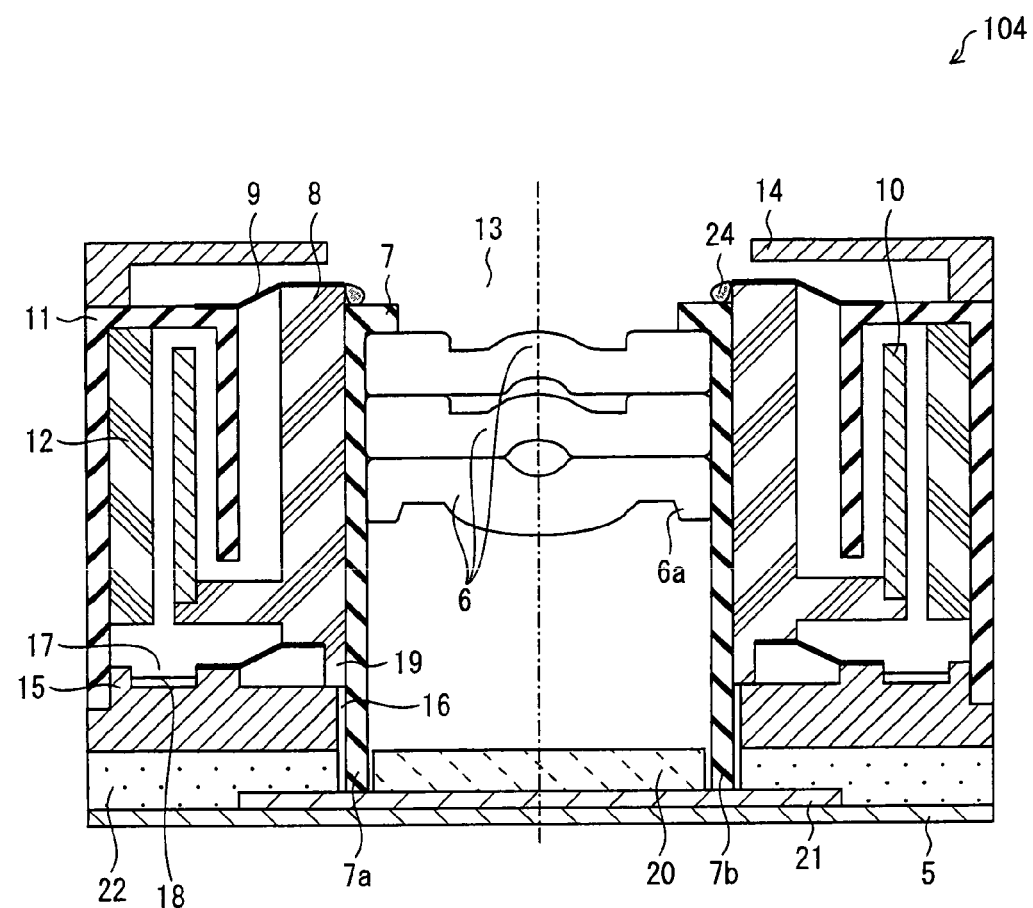
FIG. 9

Next, in the camera module 104 of FIG. 9, the position of the image pickup lenses 6 at the end at infinity is defined by contact of the bottom surface of the lens barrel 7 with the light-receiving surface of the sensor chip 21.

In the camera module 104, the bottom surface of the lens barrel 7 makes contact in such a way as to avoid the light-receiving section of the sensor chip 21. Further, as in the camera module 100, the lens barrel 7 is provided with the protruding portions 7a and 7b so that the lens barrel 7 makes partial contact with the sensor chip 21. Meanwhile, the areas on the sensor chip 21 other than the area of contact are protected by the sensor cover 22 and the glass substrate 20.

Because of the direct contact with the sensor chip 21, an error variation in focal length is only caused by the lens barrel 7, whereby the lenses can be fixed with the highest accuracy.

In FIG. 9, the lens barrel 7 and the sensor chip 21 are in contact with each other. However, as in FIG. 6 or FIG. 7, the retainer or the edge portion may make contact with the sensor chip 21. In particular, when the edge portion 6a of the image pickup lenses 6 is brought into contact with the sensor chip 21, the image pickup lenses 6 becomes a reference upon which positioning is based. This allows positioning with a higher degree of accuracy.

Figure 10:
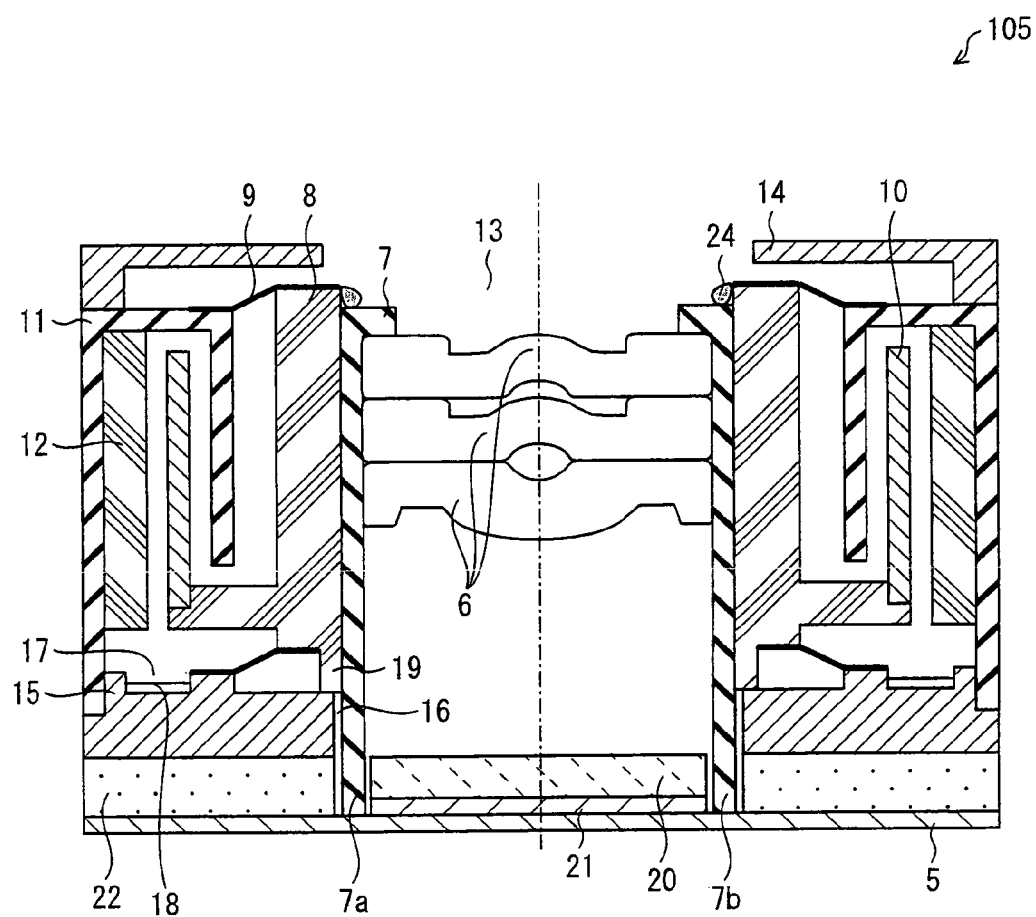
FIG. 10

Next, in the camera module 105 of FIG. 10, the position of the image pickup lenses 6 at the end at infinity is defined by contact of the bottom surface of the lens barrel 7 with that surface of the substrate 5 on which the sensor chip 21 is mounted.

In the camera module 105, when the image pickup lenses 6 are driven to the end at infinity, the bottom surface of the lens barrel 7 makes contact with that surface of the substrate 5 on which the sensor chip 21 is mounted, whereby the position of the image pickup lenses 6 at the end at infinity is defined with the surface of the substrate 5, on which the sensor chip 21 is mounted, as the reference plane of the image pickup section 3. Further, in this case, an error in focal length is only caused by a variation in thickness of the sensor chip 21 and a variation in mounting location of the image pickup lenses 6 with respect to the bottom surface of the lens barrel 7 (i.e., the reference plane of the optical section 1). This makes it possible to mount the image pickup lenses with a high degree of accuracy, thus eliminating the need for initial focus adjustment of the image pickup lenses 6.

In FIG. 10, the lens barrel 7 and the substrate 5 are in contact with each other. However, as in FIG. 6 or FIG. 7, the retainer or the edge portion of the image pickup lenses 6 may make contact with the substrate 5.

Figure 11:
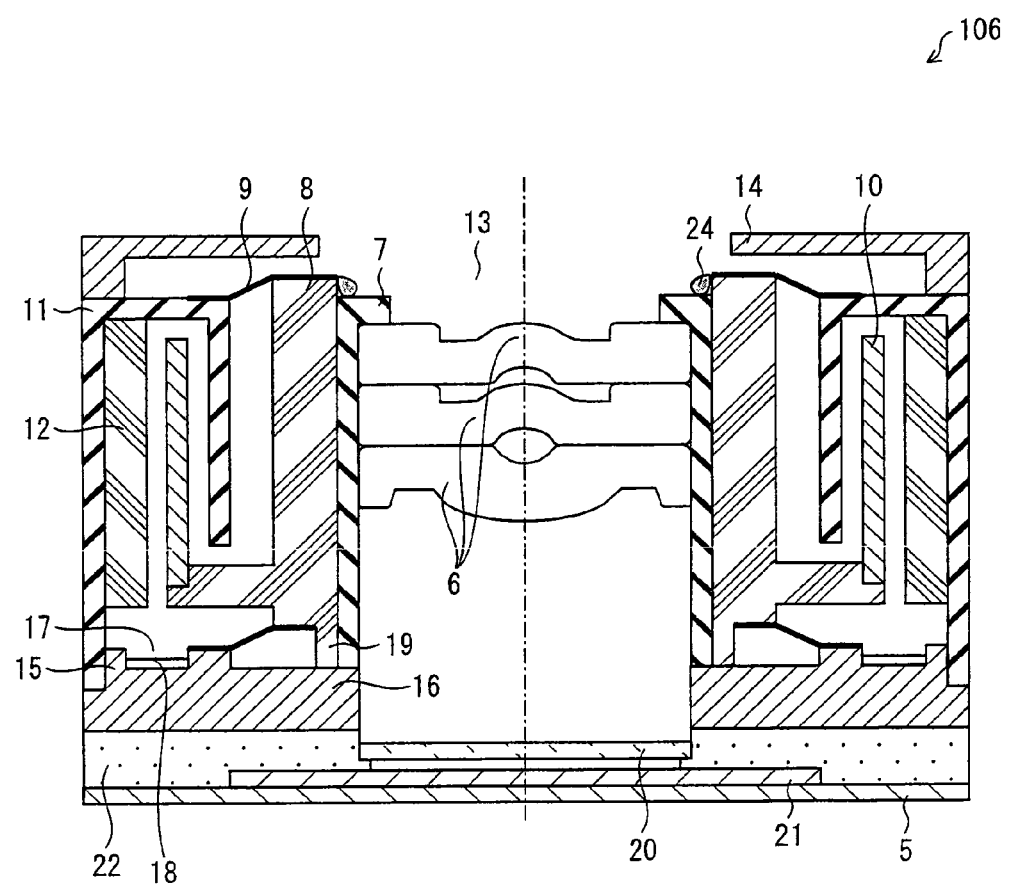
FIG. 11

Next, in the camera module 106 of FIG. 11, the position of the image pickup lenses 6 at the end at infinity is defined by contact of the bottom surface of the lens barrel 7 with the base 15 of the lens drive device 2. That is, in the camera module 106, the reference plane of the lens drive device 2 is formed on the fixed part.

In the camera module 106, an error in focal length is only caused by a variation in thickness of the sensor cover 22, a variation in thickness of the base 15, and a variation in mounting location of the image pickup lenses 6 with respect to the bottom surface of the lens barrel 7 (i.e., the reference plane of the optical section 1). This makes it possible to mount the image pickup lenses 6 with a very high degree of accuracy, thus eliminating the need for initial focus adjustment of the image pickup lenses 6.

In FIG. 11, the lens barrel 7 and the base 15 are in contact with each other. However, as in FIG. 6 or FIG. 7, the retainer or the edge portion of the image pickup lenses 6 may make contact with the base 15.

Figure 16:
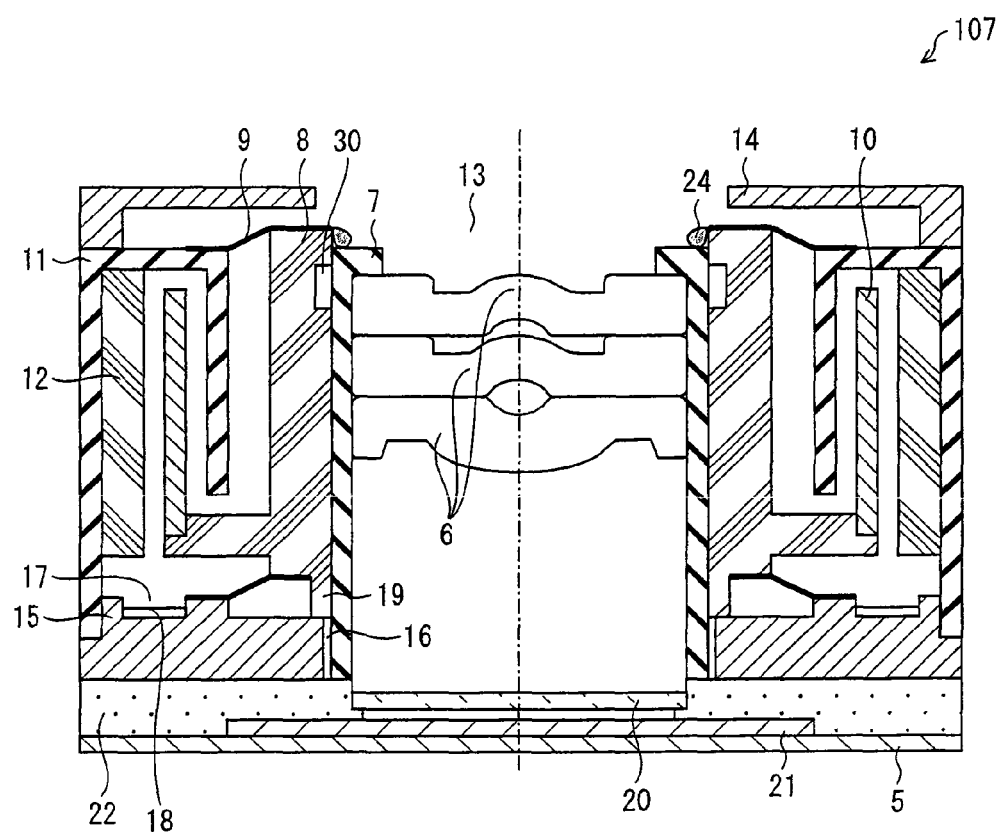
FIG. 16

Next, the camera module 107 of FIG. 16 has a depressed portion 30 formed on a portion of the internal surface of the lens holder 8. In cases where the adhesive 24 with which the lens barrel 7 and the lens holder 8 are fixed to each other has a low viscosity, the adhesive 24 may flow into the gap between the lens barrel 7 and the lens holder 8 according to a capillary phenomenon. Leakage of the adhesive 24 onto the surface of the glass substrate 20 might affect the image pickup performance. However, the formation of the depressed portion 30 causes an excess of the adhesive 24 to be collected in the depressed portion 30, thus preventing the adhesive 24 from leaking out onto the glass substrate 20.

Although the depressed portion 30 has been described by way of example where the depressed portion is formed on the side of the lens holder 8, the depressed portion 30 may be formed on the side of the lens barrel 7. That is, the depressed portion 30 only needs to be formed on at least either the external surface of the lens barrel 7 or the internal surface of the lens holder 8 (i.e., on at least either of those surfaces of the lens barrel 7 and the lens holder 8 which are in contact with each other.

Figure 17:
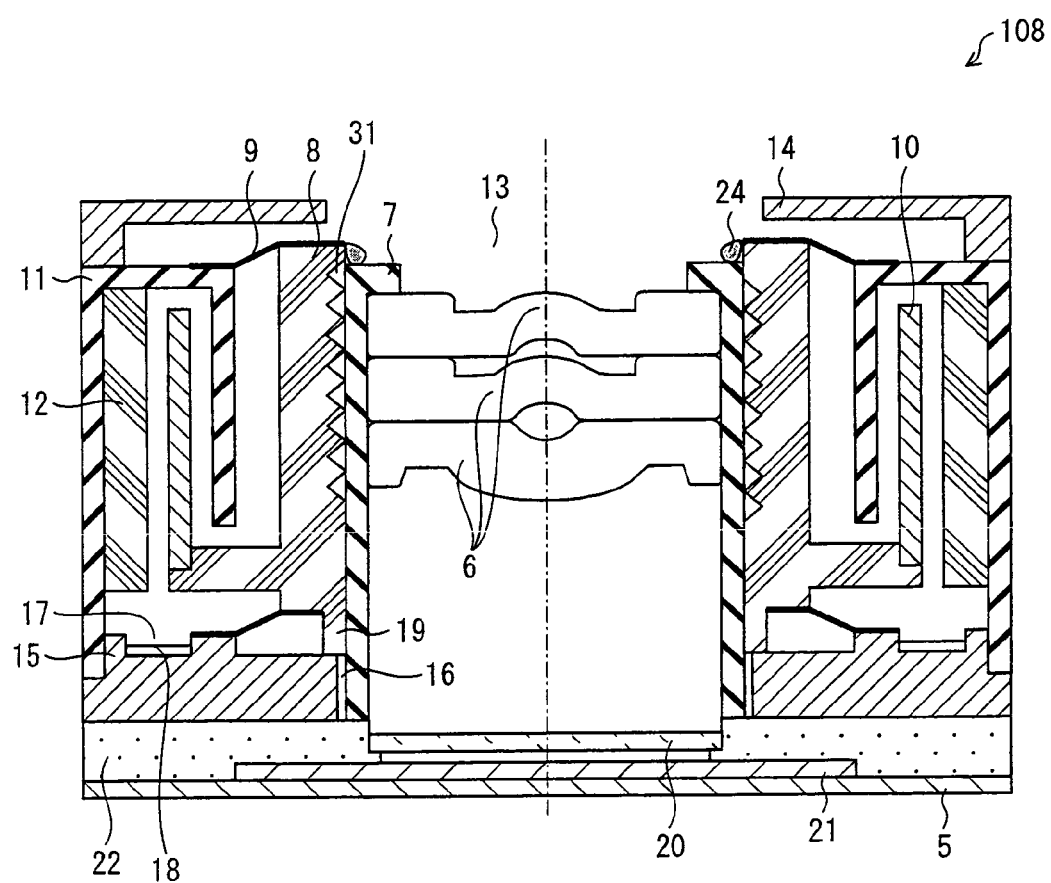
FIG. 17

Next, the camera module 108 of FIG. 17 has a thread 31 formed on a portion of the internal surface of the lens holder 8. Meanwhile, there is no thread formed on the external surface of the lens barrel 7. In cases where the adhesive 24 with which the lens barrel 7 and the lens holder 8 are fixed to each other has a low viscosity, the adhesive 24 may flow into the gap between the lens barrel and the lens holder 8 according to a capillary phenomenon. Leakage of the adhesive 24 onto the surface of the glass substrate 20 might affect the image pickup performance. However, the formation of the thread 31 causes an excess of the adhesive 24 to be collected in the thread 31, thus preventing the adhesive 24 from leaking out onto the glass substrate 20.

Thus, in the camera module 108 of FIG. 17, the thread 31 is formed to replace the depressed portion 30 of the camera module 107 of FIG. 16. For this reason, since the adhesive 24 flows along the thread 31, the distance that the adhesive 24 flows can be made longer. This makes it possible to cure the adhesive 24 by the time the adhesive 24 leaks out onto the surface of the glass substrate 20, and also makes it possible to directly use an existing lens drive device 2 already provided with a thread 31.

In the camera module 108, the thread 31 is formed on the internal surface of the lens holder 8. However, the thread 31 may be formed on the external surface of the lens barrel 7. And again, an excess of the adhesive 24 is collected in the thread 31, and therefore is prevented from leaking out onto the glass substrate 20. That is, the thread 31 only needs to be formed on at least either the external surface of the lens barrel 7 or the internal surface of the lens holder 8. This makes it unnecessary to form a focus-adjusting thread on either the lens barrel 7 or the lens holder 8. This further makes it unnecessary to control the shape of a screw in forming a thread, thus making it easy to manufacture the lens barrel 7 and the lens holder 8.

Figure 18:
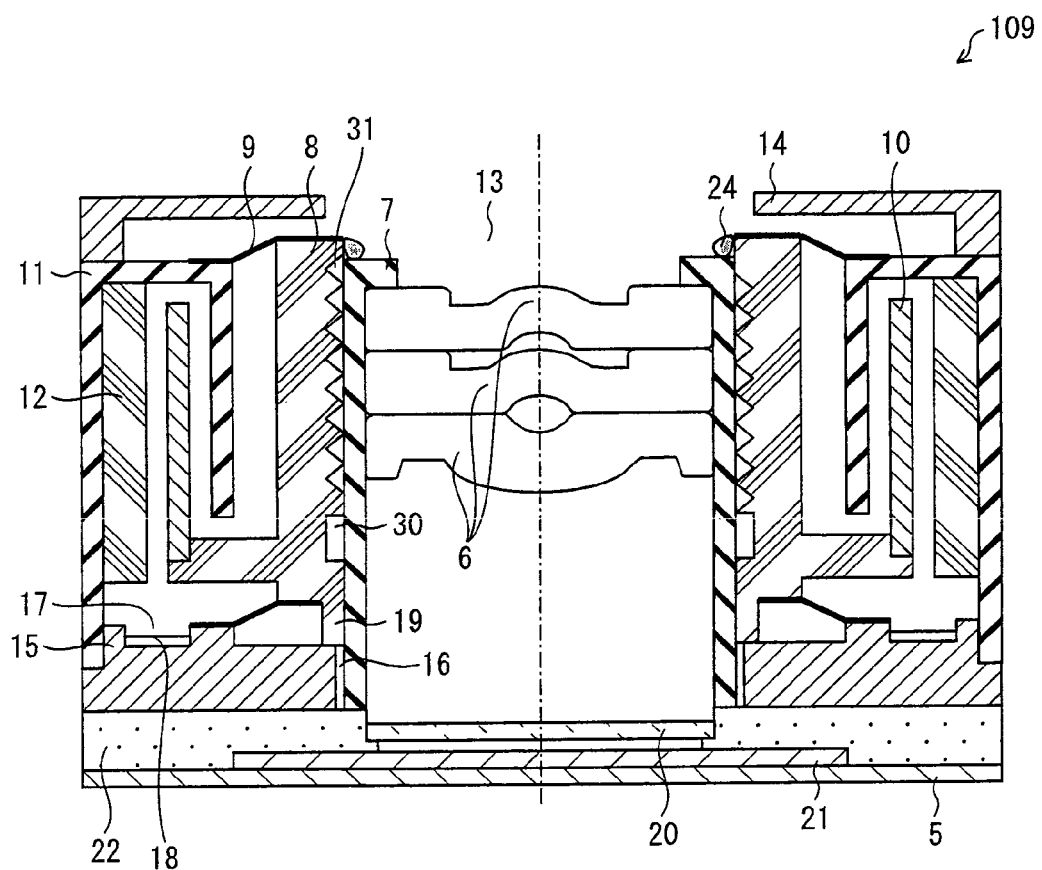
FIG. 18

Next, the camera module 109 of FIG. 18 has both the depressed portion 30 and the thread 31 formed on the internal surface of the lens holder 8. In cases where the adhesive 24 with which the lens barrel 7 and the lens holder 8 are fixed to each other has a low viscosity, the adhesive 24 may flow into the gap between the lens barrel and the lens holder 8 according to a capillary phenomenon. Leakage of the adhesive 24 onto the surface of the glass substrate 20 might affect the image pickup performance. However, the formation of the thread 31 causes the adhesive 24 to flow along the thread 31, thus making it possible lengthen the distance that the adhesive 24 flows. This makes it possible to cure the adhesive 24 by the time the adhesive 24 leaks out onto the surface of the glass substrate 20. Furthermore, the depressed portion 30 is formed in such a way as to be located closer to the glass substrate 20 than is the thread 31. For this reason, even if the adhesive 24 flows out over the thread 31 (to a lower position than the thread 31), the adhesive 24 is collected in the depressed portion 30. This makes it possible to more surely cure the adhesive 24 by the time the adhesive 24 leaks out onto the surface of the glass substrate 20. Thus, it is preferable that the depressed portion 30 be provided in such a way as to be located farther away from the place of injection of the adhesive 24 than is the thread 31.

In the camera module 109 of FIG. 18, the depressed portion 30 and the thread 31 are formed on the internal surface of the lens holder 8. However, the depressed portion 30 and the thread 31 may be formed on the external surface of the lens barrel 7, or may be separately formed on the internal surface of the lens holder 8 and the external surface of the lens barrel 7.

Figure 12:
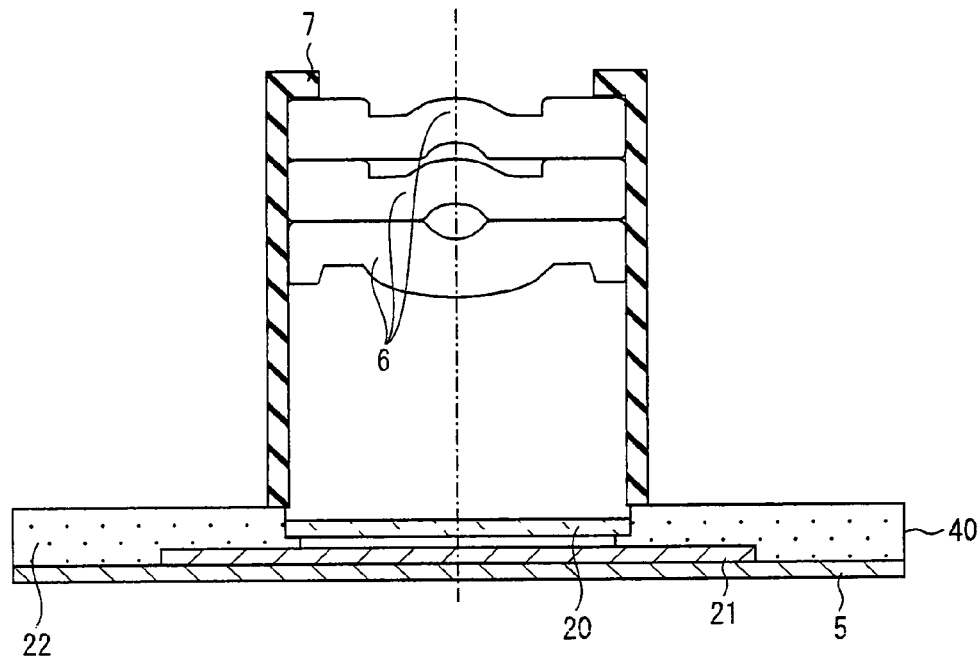
FIG. 12
Figure 13:
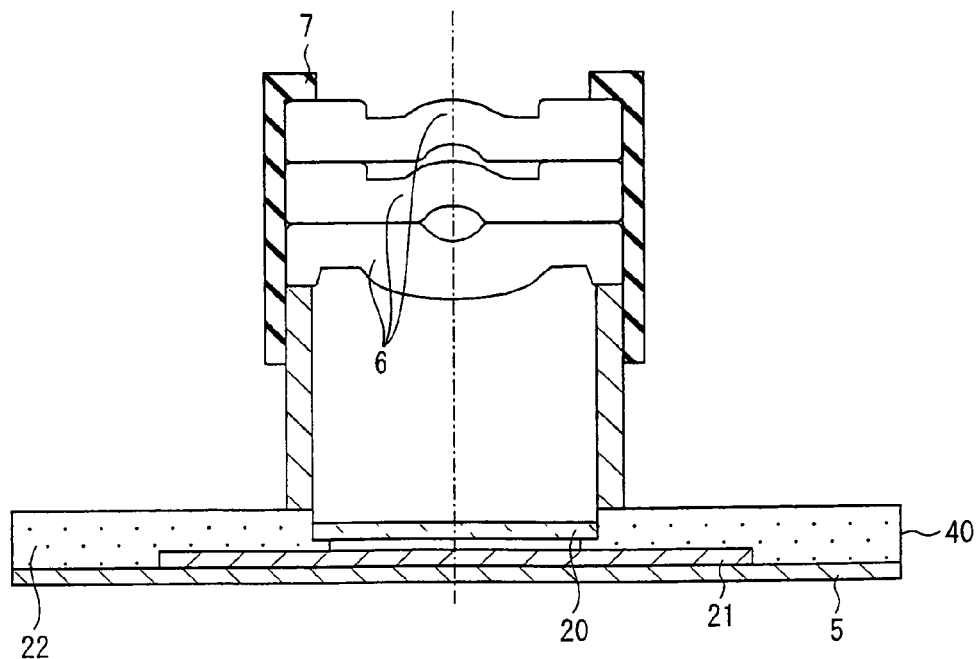
FIG. 13

Such positioning of the image pickup lenses 6 in the camera modules 100 to 111 can be applied to adjustment and confirmation of the height of the image pickup lenses 6. FIGS. 12 and 13 explain methods for positioning lenses in camera modules. In FIG. 12, the bottom surface of the lens barrel 7 is in contact with a surface of an inspection sensor 40. Meanwhile, in FIG. 13, the lower surface of the retainer 26 of the lens barrel 7 is in contact with the surface of the inspection sensor 40.

The inspection sensor 40 is an inspection jig (adjustment jig) for adjusting the height of the image pickup lenses 6. Specifically, the inspection sensor 40 is a standard sensor constituted using a sensor chip 21 having a thickness (predetermined thickness) of a design center value, a sensor cover 22, a glass substrate 22, and the like. In FIG. 12, it is a surface of the sensor cover 22 that makes contact with the bottom surface of the lens barrel 7. However, according to the aforementioned camera modules 100 to 106, it is only necessary to prepare inspection sensors that make contact with the substrate, the sensor chip, the glass substrate, the base, and the like.

Such an inspection sensor 40 is used to view shot images and the like and confirm whether the distance between the sensor chip 21 and the image pickup lenses 6 falls within a predetermined range. This allows the focal length to be surely defined. Therefore, the image pickup lenses 6 can be mounted with such a high degree of accuracy that the need for initial focus adjustment is eliminated.

Meanwhile, in such a case as in FIG. 13 where the bottom surface of the retainer 26 is brought into contact with the inspection sensor 40, a retainer 26 of the thickness at which the optimum focal length is attained is selected similarly by viewing shot images and the like. This makes it possible to adjust the focal length by adjusting the height by means of the thickness of the retainer 26. Therefore, the image pickup lenses 6 can be mounted with a high degree of accuracy by selecting a retainer 26 of the optimum thickness and mounting it to the lens barrel 7.

Figure 14:
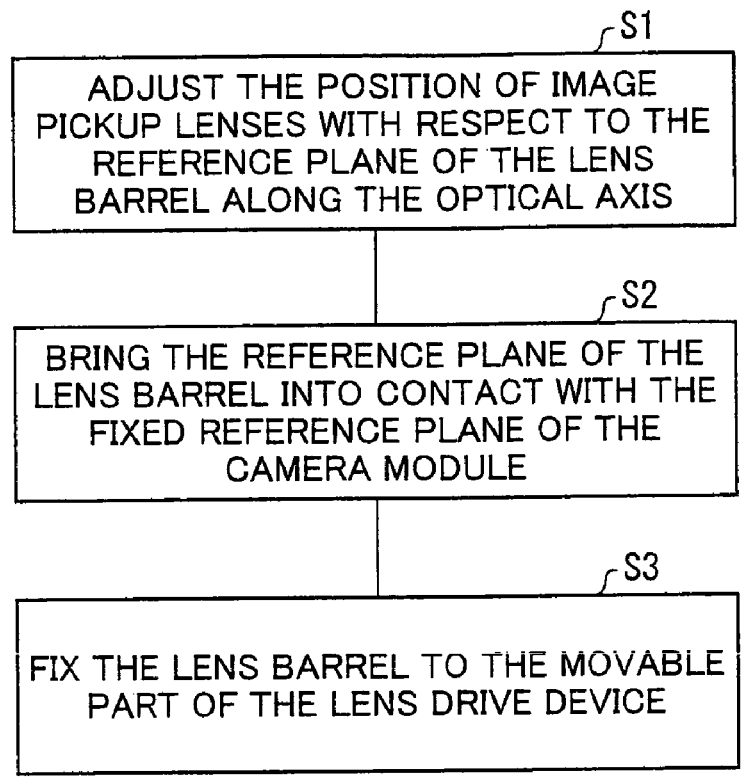
FIG. 14
Figure 15:
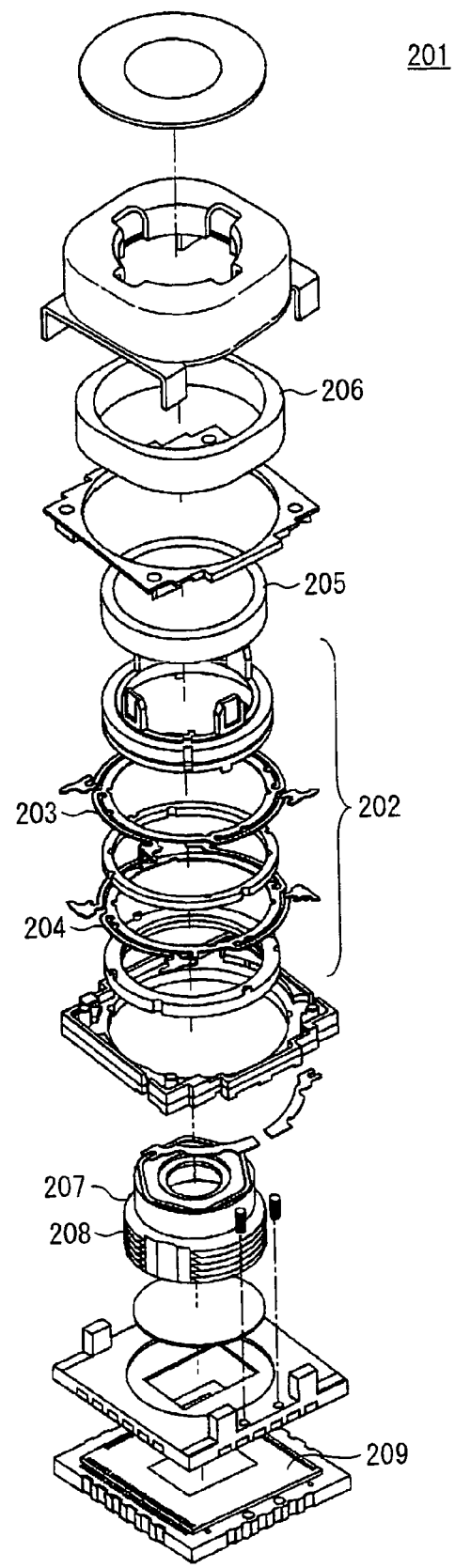
FIG. 15

FIG. 14 is a flow chart showing a lens mounting step in such a method for positioning (adjusting) the image pickup lenses 6. The lens mounting step include the steps of: adjusting the position of the image pickup lenses 6 with respect to the reference plane of the lens barrel 7 along the optical axis in advance (S1); bringing the reference plane of the lens barrel 7 into contact with a predetermined fixed reference plane of the camera module (in the case of FIG. 12, the surface of the sensor cover 22); and fixing the lens barrel 7 to the movable part (lens holder 8) of the lens drive device 2 with the lens barrel 7 in contact with the reference plane.

Specifically, first, as shown in FIGS. 12 and 13, an appropriate inspection sensor 40 is used to assemble a lens barrel 7 in which the position of the image pickup lenses 6 along the optical axis has been adjusted with a predetermined degree of accuracy (S1). Next, the lens barrel 7 is inserted into the lens holder 8 so that predetermined reference planes (the reference plane of the optical section 1 and the reference plane of the image pickup section 3 or the reference plane of the lens drive device 2) are brought into contact with each other. In the case of FIG. 12, the bottom surface of the lens barrel 7 and the surface of the sensor cover 22 are brought into contact with each other. At this point, it is desirable that the contact between the reference planes be ensured by applying light pressure to the lens barrel 7.

Next, the lens barrel 7 and the lens holder 8 are fixed to each other by injecting an adhesive into a predetermined position with the pressure kept applied, whereby the lens barrel 7 and the lens holder 8 are bonded together and the position of the image pickup lenses 6 are fixed. This makes it possible to position the image pickup lenses 6 with a high degree of accuracy without initial focus adjustment.

It should be noted that the foregoing has described a camera module including a VCM lens drive device. This is because the present invention is particularly effective in a camera module supporting a movable part with a spring as in a VCM lens drive device. However, the present invention is not limited to a VCM lens drive device, and can be applied to a lens drive device of another type (e.g., a type in which a stepping motor is used or a type in which a piezoelectric element is used).

It should be noted that the present invention can be expressed as follows:

[1] A camera module including: a lens barrel having image pickup lenses mounted therein; a lens drive device for driving the image pickup lenses between a side at infinity and a macro side along an optical axis; and an image pickup element for converting, into an electrical signal, incident light having passed through the image pickup lenses, under conditions where the lens drive device has its movable part located at a reference upon which the side at infinity is based, a portion of the lens barrel being in contact with a sensor cover provided so as to cover at least a portion of the image pickup element.

[2] The camera module as set forth in [1], wherein that portion of the lens barrel which is in contact with the sensor cover are a protruding portion provided as a portion of the lens barrel.

[3] The camera module as set forth in [2], wherein the protruding portion provided as a portion of the lens barrel is provided in such a position as not to block light supposed to be incident upon the image pickup element.

[4] The camera module as set forth in any one of [1] to [3], wherein: sensor cover is provided with a light-transmitting region through which the incident light from the image pickup lenses is guided toward the image pickup element; and the light-transmitting region is provided with a light-transmitting substrate that transmits necessary imaging light.

[5] The camera module as set forth in [4], wherein under conditions where the lens barrel is in contact with the sensor cover, the lens barrel and the light-transmitting substrate do not make contact with each other.

[6] The camera module as set forth in [5], wherein that surface of the sensor cover which is in contact with the lens barrel is in a higher position than the light-transmitting substrate.

[7] The camera module as set forth in [5], wherein that surface of the lens barrel which is facing the light-transmitting substrate is has a depressed portion provided thereon.

[8] The camera module as set forth in any one of [1] to [7], wherein that portion of the lens barrel which is in contact with the sensor cover is a portion of an edge surface of the lenses.

[9] The camera module as set forth in any one of [1] to [7], wherein that portion of the lens barrel which is in contact with the sensor cover is a retainer mounted on an edge surface of the lenses.

[10] A camera module including: a lens barrel having image pickup lenses mounted therein; a lens drive device for driving the image pickup lenses between a side at infinity and a macro side along an optical axis; an image pickup element for converting, into an electrical signal, incident light having passed through the image pickup lenses; and a light-transmitting substrate, provided between the image pickup lenses and the image pickup element, which transmits necessary imaging light, under conditions where the lens drive device has its movable part located at a reference upon which the side at infinity is based, a portion of the lens barrel being in contact with the light-transmitting substrate.

[11] The camera module as set forth in [10], wherein that portion of the lens barrel which is in contact with the light-transmitting substrate is a protruding portion provided as a portion of the lens barrel.

[12] The camera module as set forth in [11], wherein the protruding portion provided as a portion of the lens barrel is provided in such a position as not to block light supposed to be incident upon the image pickup element.

[13] The camera module as set forth in any one of [10] to [12], wherein at least either of those surfaces of the lens barrel and the light-transmitting substrate which are in contact with each other has a shock-absorbing member provided thereon.

[14] The camera module as set forth in any one of [10] to [13], wherein that portion of the lens barrel which is in contact with the light-transmitting substrate is a portion of an edge surface of the lenses.

[15] The camera module as set forth in any one of [10] to [13], wherein that portion of the lens barrel which is in contact with the light-transmitting substrate is a retainer mounted on an edge surface of the lenses.

[16] A camera module including: a lens barrel having image pickup lenses mounted therein; a lens drive device for driving the image pickup lenses between a side at infinity and a macro side along an optical axis; and an image pickup element for converting, into an electrical signal, incident light having passed through the image pickup lenses, under conditions where the lens drive device has its movable part located at a reference upon which the side at infinity is based, a portion of the lens barrel being in contact with the image pickup element.

[17] The camera module as set forth in [16], wherein that portion of the lens barrel which is in contact with the sensor cover is a protruding portion provided as a portion of the lens barrel.

[18] The camera module as set forth in [17], wherein the protruding portion provided as a portion of the lens barrel is provided in such a position as not to block light supposed be incident upon the image pickup element.

[19] The camera module as set forth in any one of [16] to [18], wherein that portion of the image pickup element which is in contact with the lens barrel is a portion that does not contribute to image pickup as the camera module.

[20] The camera module as set forth in any one of [16] to [19], further including a light-transmitting substrate, provided between the image pickup lenses and the image pickup element, which transmits necessary imaging light.

[21] The camera module as set forth in [20], wherein under conditions where the lens barrel is in contact with the image pickup element, the lens barrel and the light-transmitting substrate do not make contact with each other.

[22] The camera module as set forth in any one of [16] to [21], wherein that portion of the lens barrel which is in contact with the image pickup element is a portion of an edge surface of the lenses.

[23] The camera module as set forth in any one of [16] to [21], wherein that portion of the lens barrel which is in contact with the image pickup element is a retainer mounted on an edge surface of the lenses.

[24] A camera module including: a lens barrel having image pickup lenses mounted therein; a lens drive device for driving the image pickup lenses between a side at infinity and a macro side along an optical axis; and an image pickup element for converting, into an electrical signal, incident light having passed through the image pickup lenses, under conditions where the lens drive device has its movable part located at a reference upon which the side at infinity is based, a portion of the lens barrel being in contact with a substrate having the image pickup element mounted thereon.

[25] The camera module as set forth in [24], wherein that portion of the lens barrel which is in contact with the substrate is a protruding portion provided as a portion of the lens barrel.

[26] The camera module as set forth in [25], wherein the protruding portion provided as a portion of the lens barrel is provided in such a position as not to block light supposed be incident upon the image pickup element.

[27] The camera module as set forth in any one of [24] to [26], further including a light-transmitting substrate, provided between the image pickup lenses and the image pickup element, which transmits necessary imaging light.

[28] The camera module as set forth in [27], wherein under conditions where the lens barrel is in contact with the substrate, the lens barrel and the light-transmitting substrate do not make contact with each other.

[29] The camera module as set forth in any one of [24] to [28], wherein that portion of the lens barrel which is in contact with the substrate is a portion of an edge surface of the lenses.

[30] The camera module as set forth in any one of [24] to [28], wherein that portion of the lens barrel which is in contact with the substrate is a retainer mounted on an edge surface of the lenses.

[31] A camera module including: a lens barrel having image pickup lenses mounted therein; a lens drive device for driving the image pickup lenses between a side at infinity and a macro side along an optical axis; and an image pickup element for converting, into an electrical signal, incident light having passed through the image pickup lenses, under conditions where the lens drive device has its movable part located at a reference upon which the side at infinity is based, a portion of the lens barrel being in contact with a fixed part of the lens drive device.

[32] The camera module as set forth in [21], wherein that portion of the lens barrel which is in contact with the fixed part of the lens drive device is a portion of an edge surface of the lenses.

[33] The camera module as set forth in [31], wherein that portion of the lens barrel which is in contact with the fixed part of the lens drive device is a retainer mounted on an edge surface of the lenses.

[34] The camera module as set forth in any one of [1] to [33], wherein the movable part of the lens drive device is supported by elastic bodies (plate springs 9a and 9b).

[35] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, under conditions where the lens drive device has its movable part located at a reference upon which the side at infinity is based, the lenses being positioned by bringing a portion of the lens barrel into contact with a sensor cover provided so as to cover at least a portion the image pickup element.

[36] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, under conditions where the lens drive device has its movable part located at a reference upon which the side at infinity is based, the lenses being positioned by bringing a portion of the lens barrel into contact with a light-transmitting substrate, provided between the image pickup lenses and the image pickup element, which transmits necessary imaging light.

[37] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, under conditions where the lens drive device has its movable part located at a reference upon which the side at infinity is based, the lenses being positioned by bringing a portion of the lens barrel into contact with the image pickup element.

[38] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, under conditions where the lens drive device has its movable part located at a reference upon which the side at infinity is based, the lenses being positioned by bringing a portion of the lens barrel into contact with a substrate having the image pickup element mounted thereon.

[39] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, under conditions where the lens drive device has its movable part located at a reference upon which the side at infinity is based, the lenses being positioned by bringing a portion of the lens barrel into contact with a fixed part of the lens drive device.

[40] The lens positioning method as set forth in any one of [35] to [39], wherein the lens barrel is fixed to the lens drive device while being pressed in a direction of contact.

[41] A lens positioning method for, in a camera module camera module including (i) a lens barrel having image pickup lenses mounted therein, (ii) a lens drive device for driving the image pickup lenses between a side at infinity and a macro side along an optical axis, and (iii) an image pickup element for converting, into an electrical signal, incident light having passed through the image pickup lenses, adjusting a position of the image pickup lenses with respect to the image pickup element along the optical axis, the lens positioning method including the steps of: adjusting the position of the lenses with respect to a reference plane of the lens barrel along the optical axis in advance; bringing the reference plane of the lens barrel into contact with a predetermined fixed reference plane of the camera module; and fixing the lens barrel to the movable part of the lens drive device with the lens barrel in contact with the reference plane.

[42] The lens positioning method as set forth in [41], wherein: the reference plane of the lens barrel is a retainer mounted on an edge surface of the lenses, and the position with respect to the reference plane of the lens barrel along the optical axis is adjusted by selecting a thickness of the retainer.

Since a conventional camera module having an automatic focusing function is based on a structure (method) in which the focus is adjusted by screwing in lenses, a reduction in size of the camera module is hindered, and a great cost loss is incurred. Specifically, in the conventional camera module, the height of the lenses is adjusted by using threads respectively formed on the lens holder and the lens case. This causes such problems as follows: the burden of executing the step of screwing in the lens case, the step of adjusting the focus, and the like; a hindrance to reductions in diameter of the lens holder and the lens case due to the threads respectively formed thereon; and the need to allow for an extra stroke in consideration of a variation in screwing amount. Further, the complexity of a mold for threading (i.e., for forming threads) causes such problems as follows: an increase in molding cost; and lengthening of takt time for molding. Furthermore, in a screw-in adjustment, a change in driving torque due to a slight variation in screw shape between the lens holder and the lens case causes problems such as a large amount of labor required for torque control including maintenance.

On the other hand, according to the present invention, the lens barrel makes contact with a predetermined reference plane of the sensor cover or the like. For this reason, an error in distance from the surface of the sensor chip to the lenses is kept to the minimum cumulative error such as a variation in thickness of the sensor cover, a variation in thickness of the sensor chip, a variation in thickness of the base of the lens drive device, or a variation in mounting location of the lenses with respect to the reference plane of the lens barrel. This makes it possible to mount the lenses with a very high degree of accuracy, thus eliminating the need for initial focus adjustment including the work of screwing in the lens barrel. Further, since at least either the lens barrel or the lens holder requires no thread, a reduction in molding cost can be achieved and the need for torque control is eliminated. Further, in cases where neither of them is provided with a thread, reductions in size and diameter can be achieved by just that much. Furthermore, the elimination of the need for an extra stroke allowing for a variation in screwing amount contributes to a reduction in thickness of the module.

The camera module of the present invention is preferably configured such that at least either an external surface of the optical section or an internal surface of the lens drive section is not threaded.

According to the foregoing invention, at least either the external surface of the optical section or the internal surface of the lens drive section is not threaded. This makes it unnecessary to form a focus-adjusting thread on at least either the external surface of the optical section or the internal surface of the lens drive section. Furthermore, in the case of formation of a thread, the shape of a screw does not need to be controlled. This makes it easy to manufacture the optical section and the lens drive section.

The camera module of the present invention is preferably configured such that neither the external surface of the optical section nor the internal surface of the lens drive section is threaded.

According to the foregoing invention, neither the external surface of the optical section nor the internal surface of the lens drive section is threaded. This makes it unnecessary to form a focus-adjusting thread on the optical section or the lens drive section, thus making it possible to reduce the diameter of the camera module. Further, it is not necessary, either, to form an extra stroke in a stroke between the end at infinity and the macro end (INF position and macro position) in consideration of a variation in screwing amount. Therefore, a reduction in thickness of the camera module can also be dealt with.

Further, according to the foregoing invention, the elimination of the need to form a thread makes it possible to simplify molds for forming the optical section and the lens drive section. This makes it possible to realize a reduction in molding cost and a reduction in takt time.

Furthermore, according to the foregoing invention, a screw-in adjustment is not made. This eliminates the need for control of driving torque caused by a variation in screw shape or deterioration.

The camera module of the present invention may be configured such that the reference plane of the optical section is a bottom surface of the lens barrel.

According to the present invention, when the lens drive section drives the optical section to the end at infinity, the bottom surface of the lens barrel makes contact with the reference plane of the image pickup section or the reference plane of the lens drive section, whereby the position of the image pickup lenses at the end at infinity is defined with the bottom surface of the lens barrel, which is holding the image pickup lenses, as the reference plane of the optical section. Therefore, the image pickup lenses can be mounted with a high degree of accuracy.

The camera module of the present invention may be configured such that the bottom surface of the lens barrel has a portion removed.

According to the foregoing invention, the bottom surface of the lens barrel, which is the reference plane of the optical section, has a portion removed. This makes it possible to reduce the weight of the lens barrel, and also makes it possible to prevent optical vignetting.

The camera module of the present invention may be configured such that the optical section has its reference plane formed on an edge portion of the image pickup lenses.

According to the foregoing invention, when the lens drive section drives the optical section to the end at infinity, the reference plane formed on the edge portion of the image pickup lenses makes contact with the reference plane of the image pickup section or the reference plane of the lens drive section, whereby the position of the image pickup lenses at the end at infinity is defined with the image pickup lenses, which serves as a reference upon which the focal length is based, as the reference plane of the optical section. Therefore, the image pickup lenses can be mounted with a higher degree of accuracy.

The edge portion of the image pickup lenses is a portion that does not contribute to image pickup, and as such, does not exert any influence on actual image pickup.

The camera module of the present invention may be configured such that: a retainer is provided on an edge portion of the image pickup lenses; and the reference plane of the optical section is a bottom surface of the retainer.

According to the foregoing invention, when the lens drive section drives the optical section to the end at infinity, the bottom surface of the retainer formed on the edge portion of the image pickup lenses makes contact with the reference plane of the image pickup section or the reference plane of the lens drive section, whereby the position of the image pickup lenses at the end at infinity is defined with the image pickup lenses, which serves as a reference upon which the focal length is based, as the reference plane of the optical section. Therefore, the image pickup lenses can be mounted with a higher degree of accuracy.

The edge portion of the image pickup lenses is a portion that does not contribute to image pickup, and as such, does not exert any influence on actual image pickup.

The camera module of the present invention may be configured such that the reference plane of the optical section is provided in such a way as not to block light supposed to be incident upon the image pickup element.

According to the foregoing invention, even when the reference plane of the optical section and the reference plane of the image pickup section or the reference plane of the lens drive device are brought into contact, the reference plane of the optical section does not block light necessary for image pickup and incident upon the image pickup element. This allows appropriate image pickup while defining the position of the image pickup lenses with a high degree of accuracy.

The camera module of the present invention may be configured such that: the image pickup section includes a sensor cover covering at least a portion of the image pickup element and having a surface on which the lens drive device is mounted; and the reference plane of the image pickup section is the surface of the sensor cover.

According to the foregoing invention, when the lens drive section drives the optical section to the end at infinity, the reference plane of the optical section makes contact with the surface of the sensor cover, whereby the position of the image pickup lenses at the end at infinity is defined with the surface of the sensor cover, on which the lens drive section is mounted, as the reference plane of the image pickup section. For this reason, an error in focal length is only caused by a variation in thickness of the sensor cover and an error in mounting of the image pickup lenses in the lens barrel. Therefore, the image pickup lenses can be mounted with a high degree of accuracy.

The camera module of the present invention may be configured such that: the fixed part includes a base constituting a bottom portion of the lens drive section; the base and the sensor cover are integrated; and the reference plane of the lens drive section is the surface of the sensor cover.

According to the foregoing invention, the sensor cover of the image pickup section and the base of the lens drive section are formed from the same member. This allows a reduction in number of components. Furthermore, the sensor cover is formed with the reference plane of the lens drive section in addition to the reference plane of the image pickup section. That is, when the lens drive section drives the optical section to the end at infinity, the reference plane of the optical section makes contact with the surface of the sensor cover. The surface of the sensor cover serves both as the reference plane of the image pickup section and the reference plane of the lens drive section. Moreover, the position of the image pickup lenses at the end at infinity is defined with the surface of the sensor cover as the reference plane of the image pickup section. For this reason, an error in focal length is only caused by a variation in thickness of the sensor cover and an error in mounting of the image pickup lenses in the lens barrel. Therefore, the image pickup lenses can be mounted with a high degree of accuracy.

The camera module of the present invention may be configured such that the sensor cover has a rear surface in contact with a light-receiving surface of the image pickup element.

According to the foregoing invention, the rear surface (lower surface) of the sensor cover is in contact with the light-receiving surface, at which the focal length begins, of the image pickup element. Meanwhile, the upper surface of the sensor cover serves as the reference plane of the image pickup section. For this reason, an error in focal length is only caused by a variation in thickness of the sensor cover and an error in mounting of the image pickup lenses in the lens barrel. Therefore, the image pickup lenses can be mounted with a very high degree of accuracy.

The camera module of the present invention may be configured such that the reference plane of the image pickup section is a light-receiving surface of the image pickup element.

According to the foregoing invention, when the lens drive section drives the optical section to the end at infinity, the reference plane of the optical section makes contact with the light-receiving surface (i.e., the surface on which a light-receiving section has been formed) of the image pickup element, whereby the position of the image pickup lenses at the end at infinity is defined with the image pickup section, which serves as a reference upon which the focal length is based, as the reference plane of the image pickup section. For this reason, an error in focal length is only caused by an error in mounting of the image pickup lenses in the lens barrel. Therefore, the image pickup lenses can be mounted with a higher degree of accuracy.

The camera module of the present invention may be configured such that the reference plane of the optical section makes contact with the light-receiving surface of the image pickup element in such a way as to avoid a light-receiving section of the image pickup element.

According to the foregoing invention, when the lens drive section drives the optical section to the end at infinity, the reference plane of the optical section makes contact with the light-receiving surface (i.e., the surface on which the light-receiving section has been formed) of the image pickup element in such a way as to avoid the light-receiving section. That is, the reference plane of the image pickup element is formed on a portion that does not contribute to image pickup. Therefore, the image pickup lenses can be mounted with a high degree of accuracy without any influence on actual image pickup.

The camera module of the present invention may be configured such that: the image pickup element is mounted on a substrate; and the reference plane of the image pickup section is that surface of the substrate on which the image pickup element is mounted.

According to the foregoing invention, when the lens drive section drives the optical section to the end at infinity, the reference plane of the optical section makes contact with that surface of the substrate on which the image pickup element is mounted, whereby the position of the image pickup lenses is defined with the substrate's surface, on which the image pickup element is mounted, as the reference plane of the image pickup section. For this reason, an error in focal length is only caused by a variation in thickness of the image pickup element and an error in mounting of the image pickup lenses in the lens barrel. Therefore, the image pickup lenses can be mounted with a high degree of accuracy.

The camera module of the present invention may be configured such that the image pickup section includes a light-transmitting substrate covering a light-receiving section of the image pickup element.

According to the foregoing invention, the light-receiving section of the image pickup element is covered by the light-transmitting substrate. This makes it possible to reduce intrusion of any foreign body into the light-receiving section, thus making it possible to prevent any foreign body from causing a defect in image pickup.

The camera module of the present invention may be configured such that under conditions where the reference plane of the optical section and the reference plane of the lens drive device or the reference plane of the image pickup section are in contact with each other, the reference plane of the optical section and the light-transmitting substrate do not make contact with each other.

According to the foregoing invention, even when the reference plane of the optical section and the reference plane of the image pickup section or the reference plane of the lens drive section are brought into contact with each other, the reference plane of the optical section and the light-transmitting substrate do not make contact with each other. This makes it possible to prevent damage to the light-transmitting substrate.

The camera module of the present invention may be configured such that the reference plane of the image pickup section is provided in a position closer to the image pickup lenses than is the light-transmitting substrate.

According to the foregoing invention, the reference plane of the image pickup section is provided close to the image pickup lenses (away from the image pickup element). According to this, even when the reference plane of the optical section and the reference plane of the image pickup section or the reference plane of the lens drive section are brought into contact with each other, the reference plane of the optical section and the light-transmitting substrate do not make contact with each other. This makes it possible to prevent damage to the light-transmitting substrate.

The camera module of the present invention may be configured such that: the fixed part includes a base constituting a bottom portion of the lens drive device; and the light-transmitting substrate has a surface facing the image pickup lenses and bonded to the base.

According to the foregoing invention, the light-transmitting substrate has a top surface bonded to the base (i.e., to the fixed part of the lens drive section), whereby the light-transmitting substrate can be bonded to the lens drive section after assembly of the lens drive section. For this reason, the light-transmitting substrate is not damaged during assembly of the lens drive section. This improves workability in assembly of the lens drive section.

Furthermore, the lens drive section can be cleansed before bonding of the light-transmitting substrate. This makes it possible to bond the light-transmitting substrate to the lens drive section after removing foreign bodies generated during assembly of the lens drive section and present in the lens drive section.

The camera module of the present invention may be configured such that: the image pickup section includes a light-transmitting substrate covering a light-receiving section of the image pickup element; and the reference plane of the image pickup section is a surface of the light-transmitting substrate.

According to the foregoing invention, when the lens drive section drives the optical section to the end at infinity, the reference plane of the optical section makes contact with the surface of the sensor cover, whereby the position of the image pickup lenses at the end infinity is defined with the surface of the light-transmitting substrate, provided in the vicinity of the image pickup element, as the reference plane of the image pickup section. For this reason, an error in focal length is only caused by a variation in thickness of the light-transmitting substrate and an error in mounting of the image pickup lenses in the lens barrel. Therefore, the image pickup lenses can be mounted with a high degree of accuracy.

The camera module of the present invention may be configured such that at least either a surface of contact between the reference plane of the optical section and the reference plane of the image pickup section or a surface of contact between the reference plane of the optical section and the reference plane of the lens drive section has a shock-absorbing member provided thereon.

According to the foregoing invention, the area of contact between the optical section and the image pickup section or the lens drive section is has the shock-absorbing member provided therein, whereby the shock-absorbing member can absorb a shock that is caused by contact between the reference plane of the optical section and the reference plane of the lens drive section or the reference plane of the image pickup section. This makes it possible to prevent the optical section, the image pickup section, and the lens drive section from being damaged by a shock.

The camera module of the present invention may be configured such that the lens drive section includes an elastic body that supports the movable part so that the movable part is capable of moving along the optical axis.

According to the foregoing invention, the provision of the elastic body allows the movable part of the lens drive section to be supplementarily supported so that the movable part of the lens drive section is capable of being moved along the optical axis by the elasticity of the elastic body.

The camera module of the present invention may be configured such that at least either an external surface of the optical section or an internal surface of the lens drive section has a depressed portion formed therein.

According to the foregoing invention, at least either the external surface of the optical section or the internal surface of the lens drive section has the depressed portion formed therein. For this reason, even when the movable part of the lens drive section and the lens barrel are bonded to each other with an adhesive having a low viscosity, that portion of the adhesive which has flown down the surfaces can be collected in the depressed portion. That is, the depressed portion serves as an adhesive-collecting groove. Therefore, the adhesive can be prevented from leaking out into the image pickup section. The depressed portion may be a thread.

The camera module of the present invention may be configured such that the end at infinity is set at over infinity.

According to the foregoing invention, the end at infinity is set at over infinity. For this reason, even in cases where there is a slight error in positioning of the lens barrel or in cases where each member has a tolerance, such an error or tolerance can be absorbed by the end at infinity by driving the lens barrel.

That is, the clause "the end at infinity is set at over infinity" can be rephrased as follows: the positional relationship between the image pickup lenses and the lens barrel is such that the position of the image pickup lenses at the end at infinity is farther away (toward the image pickup element) from an optically focused focal position at infinity (optimum position) for the case where an error in positioning of the lens barrel, a tolerance of each member, or the like is not taken in to consideration.

Therefore, in this specification, the "end at infinity" encompasses that which has been set in consideration of an error in positioning of the image pickup lenses and a dimensional tolerance caused in manufacture of each member and that which has been set without taking such an error or tolerance into consideration. That is, the "end at infinity" may not be an optically optimum position at infinity for the case where such an error or tolerance is not taken into consideration.

The first lens positioning method of the present invention may be such that: the image pickup section includes a sensor cover covering at least a portion of the image pickup element and having a surface on which the lens drive device is mounted; and the reference plane of the image pickup section is the surface of the sensor cover.

According to the foregoing invention, the position of the image pickup lenses at the end at infinity is defined by contact of the reference plane of the optical section with the surface of the sensor cover. For this reason, an error in focal length is only caused by a variation in thickness of the sensor cover and an error in mounting of the image pickup lenses in the lens barrel. Therefore, the image pickup lenses can be mounted with a high degree of accuracy.

The first lens positioning method of the present invention may be such that: the fixed part includes a base constituting a bottom portion of the lens drive section; the base and the sensor cover are integrated; and the reference plane of the lens drive section is the surface of the sensor cover.

According to the foregoing invention, the sensor cover of the image pickup section and the base of the lens drive section are formed from the same member. This allows a reduction in number of components. Furthermore, the sensor cover is formed with the reference plane of the lens drive section in addition to the reference plane of the image pickup section. According to this, when the lens drive section drives the optical section to the end at infinity, the reference plane of the optical section makes contact with the surface of the sensor cover. The surface of the sensor cover serves both as the reference plane of the image pickup section and the reference plane of the lens drive section. Moreover, the position of the image pickup lenses at the end at infinity is defined with the surface of the sensor cover as the reference plane of the image pickup section. For this reason, an error in focal length is only caused by a variation in thickness of the sensor cover and an error in mounting of the image pickup lenses in the lens barrel. Therefore, the image pickup lenses can be mounted with a high degree of accuracy.

The first lens positioning method of the present invention is preferably such that the sensor cover has a rear surface in contact with a light-receiving surface of the image pickup element.

According to the foregoing invention, the rear surface (lower surface) of the sensor cover is in contact with the light-receiving surface, at which the focal length begins, of the image pickup element. Meanwhile, the upper surface of the sensor cover serves as the reference plane of the image pickup section. For this reason, an error in focal length is only caused by a variation in thickness of the sensor cover and an error in mounting of the image pickup lenses in the lens barrel. Therefore, the image pickup lenses can be mounted with a very high degree of accuracy.

The first lens positioning method of the present invention may be such that: the image pickup section includes a light-transmitting substrate covering a light-receiving section of the image pickup element; and the reference plane of the image pickup section is a surface of the light-transmitting substrate.

According to the foregoing invention, the position of the image pickup lenses at the end at infinity is defined by contact of the reference plane of the optical section with the surface of the sensor cover. For this reason, an error in focal length is only caused by a variation in thickness of the light-transmitting substrate and an error in mounting of the image pickup lenses in the lens barrel. Therefore, the image pickup lenses can be mounted with a high degree of accuracy.

The first lens positioning method of the present invention may be such that the reference plane of the image pickup section is a light-receiving surface of the image pickup element.

According to the foregoing invention, the position of the image pickup lenses at the end at infinity is defined by contact of the reference plane of the optical section with the light-receiving surface (i.e., the surface on which a light-receiving section has been formed) of the image pickup element. For this reason, an error in focal length is only caused by an error in mounting of the image pickup lenses in the lens barrel. Therefore, the image pickup lenses can be mounted with a higher degree of accuracy.

The first lens positioning method of the present invention may be such that: the image pickup element is mounted on a substrate; and the reference plane of the image pickup section is that surface of the substrate on which the image pickup element is mounted.

According to the foregoing invention, the position of the image pickup lenses is defined by contact of the reference plane of the optical section with that surface of the substrate on which the image pickup element is mounted. That is, the position of the image pickup lenses is defined with the substrate's surface, on which the image pickup element is mounted, as the reference plane of the image pickup section. For this reason, an error in focal length is only caused by a variation in thickness of the image pickup element and an error in mounting of the image pickup lenses in the lens barrel. Therefore, the image pickup lenses can be mounted with a high degree of accuracy.

The first lens positioning method of the present invention may be such that the optical section is fixed to the lens drive section with the reference plane of the optical section being pressed in a direction of contact with the reference plane of the lens drive section or the reference plane of the image pickup section.

According to the foregoing invention, since the reference plane of the optical section is pressed in the direction of contact with the reference plane of the lens drive section or the reference plane of the image pickup section, the optical section can be surely fixed to the lens drive section.

The second lens positioning method of the present invention may be such that: the reference plane of the optical section is a retainer mounted on an edge portion of the image pickup lenses; and a position of the lens barrel with respect to the reference plane along the optical axis is adjusted by selecting a thickness of the retainer.

The foregoing invention makes it possible to adjust the focal length by selecting a retainer of the thickness at which the optimum focal length is attained. Therefore, the image pickup lenses can be mounted with a high degree of accuracy by selecting a retainer of the optimum thickness from among retainers of different thickness.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention can be suitably used especially for camera modules that are mounted in various electronic devices typified by communication devices such as mobile terminals.

REFERENCE SIGNS LIST

1 Optical section
2 Lens drive device (lens drive section)
3 Image pickup section
4 Sensor section
5 Substrate
6 Image pickup lens
6a Edge portion
7 Lens barrel
8 Lens holder (movable part)
9 Plate spring (elastic body)
15 Base (fixed part)
20 Glass substrate (light-transmitting substrate)
21 Sensor chip (image pickup element)
22 Sensor cover
22a Aperture (light-transmitting region)
25 Light-receiving section
26 Retainer
30 Depressed portion
31 Thread
100 to 111 Camera module

The invention claimed is:

1. A camera module comprising: an optical section having image pickup lenses and a lens barrel holding the image pickup lenses; a lens drive section that drives the image pickup lenses from an end at infinity to a macro end along an optical axis; and an image pickup section having an image pickup element that converts, into an electrical signal, incident light having passed through the image pickup lenses, the lens drive section including (a) a movable part comprising a lens holder, holding the optical section therein, which is capable of moving along the optical axis and (b) a fixed part whose position does not vary when the image pickup lenses are driven, when the lens drive section drives the image pickup lenses to the end at infinity, a reference plane of the optical section and a reference plane of the lens drive section or a reference plane of the image pickup section making contact with each other, the reference plane of the lens drive section being formed on the fixed part.

2. The camera module as set forth in claim 1, wherein at least either an external surface of the optical section or an internal surface of the lens drive section is not threaded.

3. The camera module as set forth in claim 2, wherein neither the external surface of the optical section nor the internal surface of the lens drive section is threaded.

4. The camera module as set forth in claim 1, wherein the reference plane of the optical section is a bottom surface of the lens barrel.

5. The camera module as set forth in claim 4, wherein the bottom surface of the lens barrel has a portion removed.

6. The camera module as set forth in claim 1, the optical section has its reference plane formed on an edge portion of the image pickup lenses.

7. The camera module as set forth in claim 1, wherein: a retainer is provided on an edge portion of the image pickup lenses; and the reference plane of the optical section is a bottom surface of the retainer.

8. The camera module as set forth in claim 1, wherein the reference plane of the optical section is provided in such a way as not to block light supposed to be incident upon the image pickup element.

9. The camera module as set forth in claim 8, wherein the lens drive section includes an elastic body that supports the movable part so that the movable part is capable of moving along the optical axis.

10. The camera module as set forth in claim 1, wherein: the image pickup section includes a sensor cover covering at least a portion of the image pickup element and having a surface on which the lens drive section is mounted; and the reference plane of the image pickup section is the surface of the sensor cover.

11. The camera module as set forth in claim 10, wherein: the fixed part includes a base constituting a bottom portion of the lens drive section; the base and the sensor cover are integrated; and the reference plane of the lens drive section is the surface of the sensor cover.

12. The camera module as set forth in claim 10, wherein the sensor cover has a rear surface in contact with a light-receiving surface of the image pickup element.

13. The camera module as set forth in claim 1, wherein the reference plane of the image pickup section is a light-receiving surface of the image pickup element.

14. The camera module as set forth in claim 13, wherein the reference plane of the optical section makes contact with the light-receiving surface of the image pickup element in such a way as to avoid a light-receiving section of the image pickup element.

15. The camera module as set forth in claim 1, wherein: the image pickup element is mounted on a substrate; and the reference plane of the image pickup section is that surface of the substrate on which the image pickup element is mounted.

16. The camera module as set forth in claim 1, wherein the image pickup section includes a light-transmitting substrate covering a light-receiving section of the image pickup element.

17. The camera module as set forth in claim 16, wherein under conditions where the reference plane of the optical section and the reference plane of the lens drive section or the reference plane of the image pickup section are in contact with each other, the reference plane of the optical section and the light-transmitting substrate do not make contact with each other.

18. The camera module as set forth in claim 16, wherein the reference plane of the image pickup section is provided in a position closer to the image pickup lenses than is the light-transmitting substrate.

19. The camera module as set forth in claim 16, wherein: the fixed part includes a base constituting a bottom portion of the lens drive section; and the light-transmitting substrate has a surface facing the image pickup lenses and bonded to the base.

20. The camera module as set forth in claim 1, wherein: the image pickup section includes a light-transmitting substrate covering a light-receiving section of the image pickup element; and the reference plane of the image pickup section is a surface of the light-transmitting substrate.

21. The camera module as set forth in claim 1, wherein at least either a surface of contact between the reference plane of the optical section and the reference plane of the image pickup section or a surface of contact between the reference plane of the optical section and the reference plane of the lens drive section has a shock-absorbing member provided thereon.

22. The camera module as set forth in claim 1, wherein at least either an external surface of the optical section or an internal surface of the lens drive section has a depressed portion formed therein.

23. The camera module as set forth in claim 1, wherein the end at infinity is set at over infinity.

24. A lens positioning method for, in a camera module including (i) an optical section having image pickup lenses and a lens barrel holding the image pickup lenses, (ii) a lens drive section that drives the image pickup lenses from an end at infinity to a macro end along an optical axis, and (iii) an image pickup section having an image pickup element that converts, into an electrical signal, incident light having passed through the image pickup lenses, the lens drive section including (a) a movable part comprising a lens holder holding the optical section therein, which is capable of moving along the optical axis and (b) a fixed part whose position does not vary when the image pickup lenses are driven, defining a position of the image pickup section along the optical axis, the lens positioning method including the steps of:
   adjusting the position of the image pickup lenses with respect to a reference plane of the lens barrel along the optical axis;
   bringing the reference plane of the lens barrel into contact with a reference plane of the lens drive section or a reference plane of the image pickup section, the reference plane of the lens drive section being formed on the fixed part; and
   fixing the lens barrel to the movable part of the lens drive section with the reference plane of the lens barrel in contact with the reference plane of the lens drive section or the reference plane of the image pickup section.

25. The lens positioning method as set forth in claim 24, wherein: the reference plane of the optical section is a retainer mounted on an edge portion of the image pickup lenses; and a position of the lens barrel with respect to the reference plane along the optical axis is adjusted by selecting a thickness of the retainer.

26. An electronic device including a camera module comprising: an optical section having image pickup lenses and a lens barrel holding the image pickup lenses; a lens drive section that drives the image pickup lenses from an end at infinity to a macro end along an optical axis; and an image pickup section having an image pickup element that converts, into an electrical signal, incident light having passed through the image pickup lenses, the lens drive section including (a) a movable part comprising a lens holder, holding the optical section therein, which is capable of moving along the optical axis and (b) a fixed part whose position does not vary when the image pickup lenses are driven, when the lens drive section drives the image pickup lenses to the end at infinity, a reference plane of the optical section and a reference plane of the lens drive section or a reference plane of the image pickup section making contact with each other, the reference plane of the lens drive section being formed on the fixed part.

* * * * *